(12) United States Patent
Colson et al.

(10) Patent No.: US 10,975,616 B2
(45) Date of Patent: Apr. 13, 2021

(54) COVERING FOR ARCHITECTURAL FEATURES, RELATED SYSTEMS, AND METHODS OF MANUFACTURE

(71) Applicant: Hunter Douglas, Inc., Pearl River, NY (US)

(72) Inventors: Wendell B. Colson, Weston, MA (US); Ko Kuperus, Superior, CO (US); Bonnie Earl, Carbondale, CO (US); Kelly Rahn, Dacono, CO (US); Kent A. Smith, Broomfield, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 452 days.

(21) Appl. No.: 15/789,014

(22) Filed: Oct. 20, 2017

(65) Prior Publication Data

US 2018/0119485 A1  May 3, 2018

Related U.S. Application Data

(60) Provisional application No. 62/414,248, filed on Oct. 28, 2016, provisional application No. 62/525,549, filed on Jun. 27, 2017.

(51) Int. Cl.
*E06B 9/264* (2006.01)
*E06B 9/266* (2006.01)
(Continued)

(52) U.S. Cl.
CPC ........... *E06B 9/264* (2013.01); *B29C 65/086* (2013.01); *B29C 65/18* (2013.01); *B29C 65/743* (2013.01);
(Continued)

(58) Field of Classification Search
CPC ... E06B 9/26; E06B 9/262; E06B 9/40; E06B 2009/2423; E06B 2009/2435;
(Continued)

(56) References Cited

U.S. PATENT DOCUMENTS 2,078,940 A * 5/1937 Grebe ................. E06B 9/24
245/8
2,205,581 A * 6/1940 Staff ................. D04B 21/10
66/192

(Continued)

FOREIGN PATENT DOCUMENTS

EP 0549216 A1 6/1993
GB 476021 A * 11/1937 ............... E06B 9/52
(Continued)

*Primary Examiner* — Johnnie A. Shablack
(74) *Attorney, Agent, or Firm* — Scully Scott Murphy & Presser

(57) ABSTRACT

A covering for an architectural feature having generally horizontal vane elements coupled to and located between generally front and rear generally vertical support members, which in preferred embodiments are adjustable to control the amount of light transmitted through the covering. In one embodiment the covering has three dimensional multi-layered, cellular vanes, and in another embodiment, the one or more support members are formed of a dark color, and the rear support member(s) may be formed of material that is darker than the front support member(s), or vise versa. In another embodiment, the support members, e.g., sheers, have an openness factor, preferably as low as about sixty-five percent (65%) to as large as about ninety percent (90%). Other embodiments include structure, assemblies and methods for controlling the closure of the covering as well as embodiments of bottom rail assemblies. Also provided is a method of manufacturing the covering.

36 Claims, 13 Drawing Sheets

(51) Int. Cl.
| | |
|---|---|
| *B29C 65/74* | (2006.01) |
| *B29C 65/08* | (2006.01) |
| *B29C 65/00* | (2006.01) |
| *B29C 65/18* | (2006.01) |
| *E06B 9/262* | (2006.01) |
| *E06B 9/34* | (2006.01) |
| *E06B 9/382* | (2006.01) |
| *E06B 9/386* | (2006.01) |
| *E06B 9/24* | (2006.01) |
| *B29K 67/00* | (2006.01) |
| *B29K 105/00* | (2006.01) |
| *B29L 31/00* | (2006.01) |

(52) U.S. Cl.
CPC ........ B29C 65/7443 (2013.01); B29C 66/137 (2013.01); B29C 66/437 (2013.01); B29C 66/729 (2013.01); B29C 66/81417 (2013.01); E06B 9/262 (2013.01); E06B 9/266 (2013.01); E06B 9/34 (2013.01); E06B 9/382 (2013.01); E06B 9/386 (2013.01); *B29C 66/71* (2013.01); *B29K 2067/00* (2013.01); *B29K 2105/256* (2013.01); *B29L 2031/719* (2013.01); *E06B 2009/2423* (2013.01); *E06B 2009/2435* (2013.01); *E06B 2009/2458* (2013.01); *E06B 2009/2627* (2013.01)

(58) Field of Classification Search
CPC ..... E06B 2009/2627; E06B 2009/2447; E06B 2009/2452; E06B 2009/2458; E06B 2009/2405; E06B 2009/2417; D03D 9/00
See application file for complete search history.

(56) References Cited

U.S. PATENT DOCUMENTS

| | | | | |
|---|---|---|---|---|
| 2,559,341 | A * | 7/1951 | Brierley | D03D 19/00 139/419 |
| 3,068,547 | A * | 12/1962 | L Hommedieu | D04H 1/495 428/131 |
| 3,081,515 | A * | 3/1963 | Griswold | D04H 1/736 428/131 |
| 3,384,519 | A * | 5/1968 | Froget | B29C 65/02 156/65 |
| 3,681,184 | A * | 8/1972 | Kalwaites | D04H 1/74 428/134 |
| 4,019,554 | A * | 4/1977 | Rasmussen | A01G 9/222 160/84.02 |
| 4,377,195 | A * | 3/1983 | Weil | A47H 23/08 160/237 |
| 4,469,738 | A * | 9/1984 | Himelreich, Jr. | A47C 7/32 264/DIG. 81 |
| 4,530,113 | A * | 7/1985 | Matterson | A61F 2/06 623/1.51 |
| 4,563,382 | A * | 1/1986 | Viel | D02G 3/36 42/19 |
| 5,168,005 | A * | 12/1992 | Keating | B01D 69/10 139/DIG. 1 |
| 5,244,711 | A * | 9/1993 | Drelich | D04H 3/02 428/105 |
| 5,313,999 | A * | 5/1994 | Colson | B29C 65/02 160/121.1 |
| 5,339,883 | A * | 8/1994 | Colson | E06B 9/262 160/84.05 |
| 5,392,832 | A * | 2/1995 | Colson | E06B 9/262 160/168.1 R |
| 5,394,922 | A * | 3/1995 | Colson | B29C 65/02 160/121.1 |
| 5,419,385 | A * | 5/1995 | Vogel | E06B 9/262 160/121.1 |
| 5,454,414 | A * | 10/1995 | Colson | E06B 9/262 160/84.02 |
| 5,456,304 | A * | 10/1995 | Colson | E06B 9/171 160/121.1 |
| 5,558,925 | A * | 9/1996 | Fritzman | B31D 3/002 156/107 |
| 5,647,421 | A * | 7/1997 | Hoffmann | E06B 9/40 160/120 |
| 5,664,613 | A * | 9/1997 | Jelic | E06B 9/30 160/121.1 |
| 5,753,338 | A * | 5/1998 | Jelic | D04B 21/20 139/35 |
| 5,806,579 | A * | 9/1998 | Judkins | E06B 9/262 160/168.1 R |
| 5,855,235 | A * | 1/1999 | Colson | E06B 9/171 160/121.1 |
| 5,965,467 | A * | 10/1999 | Stevenson | D03D 9/00 405/129.75 |
| 6,001,199 | A * | 12/1999 | Colson | B29C 65/02 156/265 |
| 6,068,039 | A * | 5/2000 | Judkins | E06B 9/262 160/121.1 |
| 6,112,797 | A * | 9/2000 | Colson | B29C 65/02 160/121.1 |
| 6,164,363 | A * | 12/2000 | Colson | E06B 9/262 160/166.1 |
| 6,171,424 | B1 * | 1/2001 | Barss | E06B 9/262 156/174 |
| 6,196,291 | B1 * | 3/2001 | Rupel | E06B 9/262 160/84.05 |
| 6,302,982 | B1 * | 10/2001 | Corey | B29C 66/437 156/73.4 |
| 6,377,384 | B2 * | 4/2002 | Corey | B29C 66/437 359/227 |
| 6,397,920 | B1 * | 6/2002 | Forin | D03D 9/00 139/383 R |
| 6,440,247 | B2 * | 8/2002 | Rupel | E06B 9/262 156/197 |
| 6,474,396 | B1 * | 11/2002 | Toder | A47H 13/04 160/237 |
| 6,484,786 | B1 * | 11/2002 | Ruggles | E06B 9/262 160/121.1 |
| 6,575,222 | B2 * | 6/2003 | Corey | B29C 66/437 160/84.05 |
| 6,634,409 | B2 * | 10/2003 | Corey | B29C 66/437 160/236 |
| 6,688,369 | B2 * | 2/2004 | Colson | B29C 65/02 160/121.1 |
| 6,688,370 | B1 * | 2/2004 | Nien | E06B 9/34 160/121.1 |
| 6,772,815 | B1 * | 8/2004 | Judkins | E06B 9/264 160/178.3 |
| 6,823,923 | B2 * | 11/2004 | Palmer | E06B 9/262 160/84.05 |
| 7,059,378 | B2 * | 6/2006 | Colson | B29C 65/02 160/121.1 |
| 7,172,802 | B2 * | 2/2007 | Sutherland | D03D 9/00 139/417 |
| 7,192,633 | B2 * | 3/2007 | Fransen | D03D 11/00 160/123 |
| D600,057 | S * | 9/2009 | Cha | D6/575 |
| 7,628,195 | B2 * | 12/2009 | Drew | E06B 7/086 160/84.05 |
| 7,686,060 | B2 * | 3/2010 | Anthony | E06B 9/34 160/116 |
| 7,694,696 | B2 * | 4/2010 | Chang | D03D 1/08 139/383 R |
| 7,699,954 | B2 * | 4/2010 | Colson | B32B 7/12 156/178 |
| 7,980,288 | B2 * | 7/2011 | Judkins | E06B 9/264 160/166.1 |
| 8,051,684 | B2 * | 11/2011 | Keitch | D04B 21/12 66/193 |
| 8,353,326 | B2 * | 1/2013 | Chang | D03D 1/007 139/383 R |
| 8,950,462 | B2 * | 2/2015 | Cha | D03D 1/08 139/384 A |
| 9,175,509 | B2 * | 11/2015 | Clarren | E06B 9/24 |

(56) References Cited

U.S. PATENT DOCUMENTS

| | | | | |
|---|---|---|---|---|
| 9,260,914 B2* | 2/2016 | Certain | | E06B 9/26 |
| 9,267,324 B2* | 2/2016 | Strand | | E06B 9/262 |
| 9,322,210 B2* | 4/2016 | Lukosiunas | | E06B 9/26 |
| 9,353,570 B2* | 5/2016 | Smith | | E06B 9/38 |
| 9,382,755 B2* | 7/2016 | Jelic | | A47H 23/04 |
| 9,512,672 B2* | 12/2016 | Colson | | E06B 9/42 |
| 9,567,802 B2* | 2/2017 | Buccola, Jr. | | E06B 9/322 |
| 9,611,689 B2* | 4/2017 | Blair | | E06B 9/264 |
| 9,624,721 B2* | 4/2017 | Rubinoff | | E06B 9/40 |
| 9,719,297 B1* | 8/2017 | Chen | | E06B 9/34 |
| 9,840,867 B2* | 12/2017 | Lukosiunas | | E06B 9/26 |
| 9,909,361 B2* | 3/2018 | Buccola, Jr. | | E06B 9/322 |
| 9,945,177 B2* | 4/2018 | Drew | | E06B 9/44 |
| 9,982,481 B2* | 5/2018 | Marocco | | E06B 9/264 |
| 10,174,551 B2* | 1/2019 | Buccola, Jr. | | E06B 9/367 |
| 10,443,304 B2* | 10/2019 | Colson | | E06B 9/34 |
| 2003/0181110 A1* | 9/2003 | Bouvant | | D04B 21/10 442/1 |
| 2003/0186606 A1* | 10/2003 | Sutherland | | D03D 15/00 442/301 |
| 2005/0215147 A1* | 9/2005 | Masters | | D04B 21/16 442/59 |
| 2005/0230064 A1* | 10/2005 | Graichen | | D04B 19/00 160/236 |
| 2006/0180278 A1* | 8/2006 | Colson | | B29C 65/02 160/84.04 |
| 2007/0175595 A1* | 8/2007 | Lin | | A47H 2/00 160/84.04 |
| 2007/0175596 A1* | 8/2007 | Chien | | E06B 9/34 160/121.1 |
| 2008/0053625 A1* | 3/2008 | Anthony | | E06B 9/40 160/121.1 |
| 2008/0127598 A1* | 6/2008 | Kallstrom | | F41H 5/0485 52/656.7 |
| 2011/0067821 A1* | 3/2011 | Byeon | | D03D 15/00 160/123 |
| 2011/0120661 A1* | 5/2011 | Kim | | D03D 11/02 160/89 |
| 2011/0284173 A1* | 11/2011 | Neher | | D03D 19/00 160/369 |
| 2012/0043029 A1* | 2/2012 | Gaskill | | E06B 9/42 160/121.1 |
| 2012/0085504 A1* | 4/2012 | Cha | | D03D 15/00 160/236 |
| 2012/0090229 A1* | 4/2012 | Toye | | A01G 13/0206 47/31 |
| 2013/0163062 A1* | 6/2013 | Yang | | E06B 9/24 359/228 |
| 2014/0138037 A1* | 5/2014 | Colson | | E06B 9/262 160/290.1 |
| 2014/0234588 A1* | 8/2014 | DeCologero | | E06B 9/40 428/195.1 |
| 2015/0038040 A1* | 2/2015 | Gabbay | | D03D 15/0061 442/189 |
| 2015/0059239 A1* | 3/2015 | Andersson | | D04B 21/16 47/21.1 |
| 2015/0176328 A1* | 6/2015 | Ballard, Jr. | | E06B 9/266 29/428 |
| 2015/0223411 A1* | 8/2015 | Toye | | D03D 1/007 442/49 |
| 2015/0247267 A1* | 9/2015 | Corey | | D03D 19/00 29/897.31 |
| 2016/0215558 A1* | 7/2016 | Byun | | E06B 9/262 |
| 2016/0258211 A1* | 9/2016 | Smith | | E06B 9/38 |
| 2017/0037679 A1* | 2/2017 | An | | E06B 9/34 |
| 2017/0118926 A1* | 5/2017 | Toye | | A01G 13/043 |
| 2017/0159355 A1* | 6/2017 | Blair | | E06B 9/264 |
| 2018/0080278 A1* | 3/2018 | Huang | | E06B 9/322 |
| 2018/0119487 A1* | 5/2018 | Colson | | E06B 9/384 |
| 2018/0171703 A1* | 6/2018 | Buccola, Jr. | | E06B 9/322 |
| 2018/0179812 A1* | 6/2018 | Dubina | | E06B 9/42 |
| 2018/0328106 A1* | 11/2018 | Smith | | E06B 9/38 |
| 2018/0347270 A1* | 12/2018 | Schroeder | | E06B 9/323 |
| 2019/0119977 A1* | 4/2019 | Colson | | E06B 9/34 |
| 2019/0136614 A1* | 5/2019 | Colson | | D03D 11/02 |
| 2019/0211621 A1* | 7/2019 | Morgan, III | | E06B 9/24 |
| 2019/0316413 A1* | 10/2019 | Huang | | E06B 9/386 |
| 2019/0338586 A1* | 11/2019 | Swiszcz | | E06B 9/262 |
| 2019/0339426 A1* | 11/2019 | Malkan | | D03D 1/007 |
| 2020/0080370 A1* | 3/2020 | Rahn | | D03D 19/00 |

FOREIGN PATENT DOCUMENTS

| | | | | |
|---|---|---|---|---|
| GB | 716605 A | * | 10/1954 | D04B 21/10 |
| GB | 1494842 A | * | 12/1977 | E06B 9/26 |
| KR | 101363745 B1 | | 2/2014 | |
| WO | WO-2008053116 A3 | * | 6/2008 | D04B 21/10 |
| WO | WO-2010137590 A1 | * | 12/2010 | G02B 5/02 |

* cited by examiner

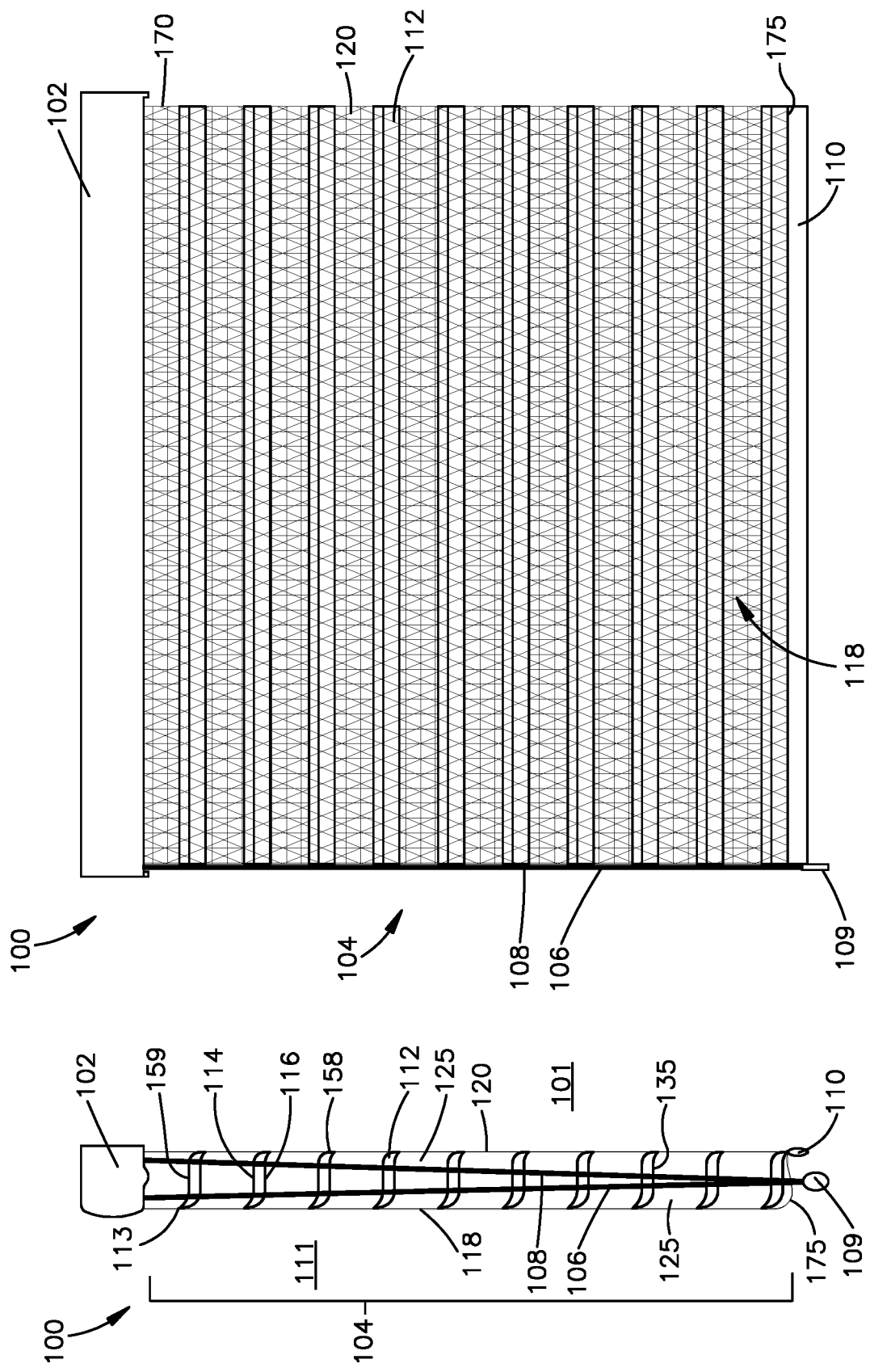

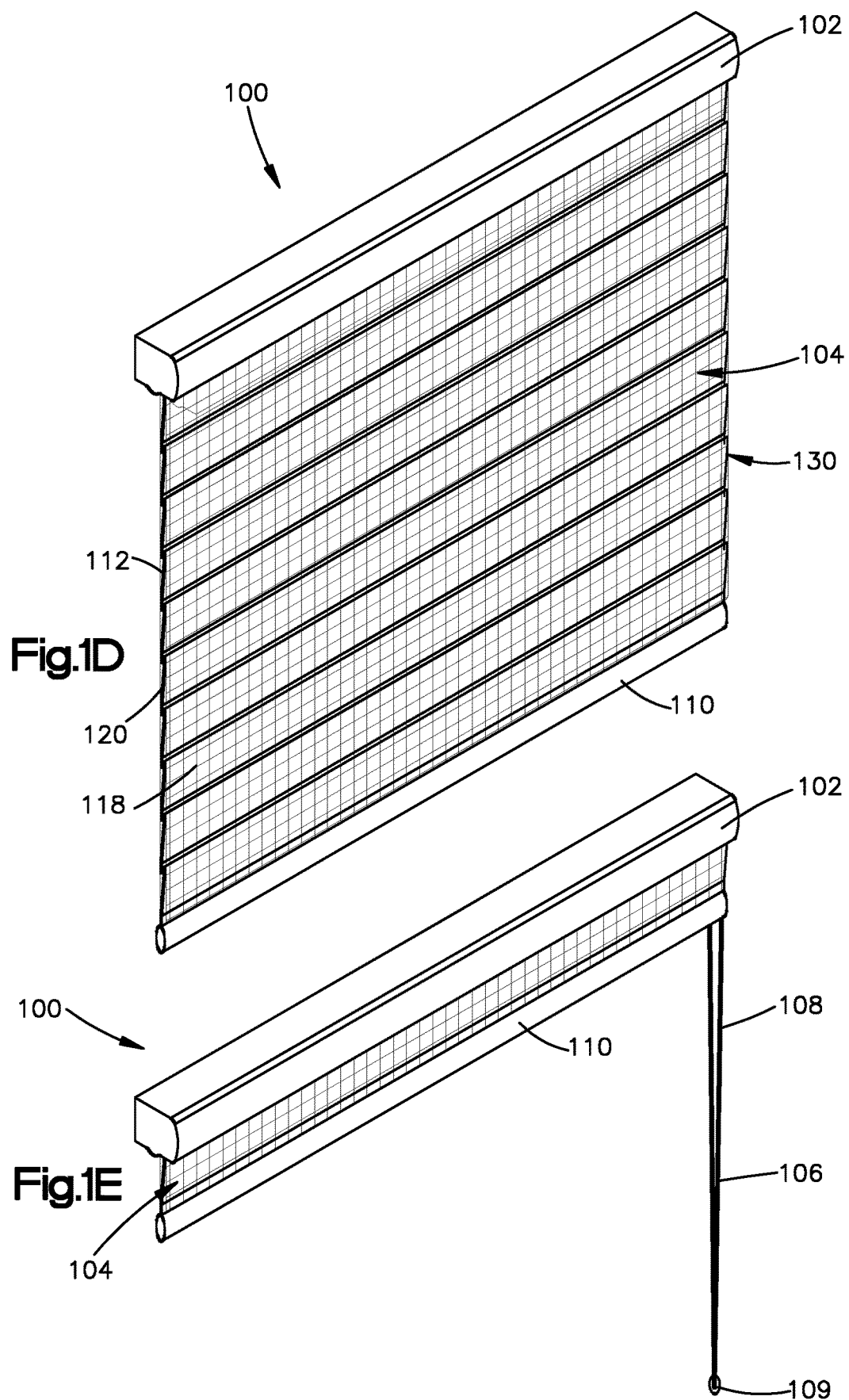

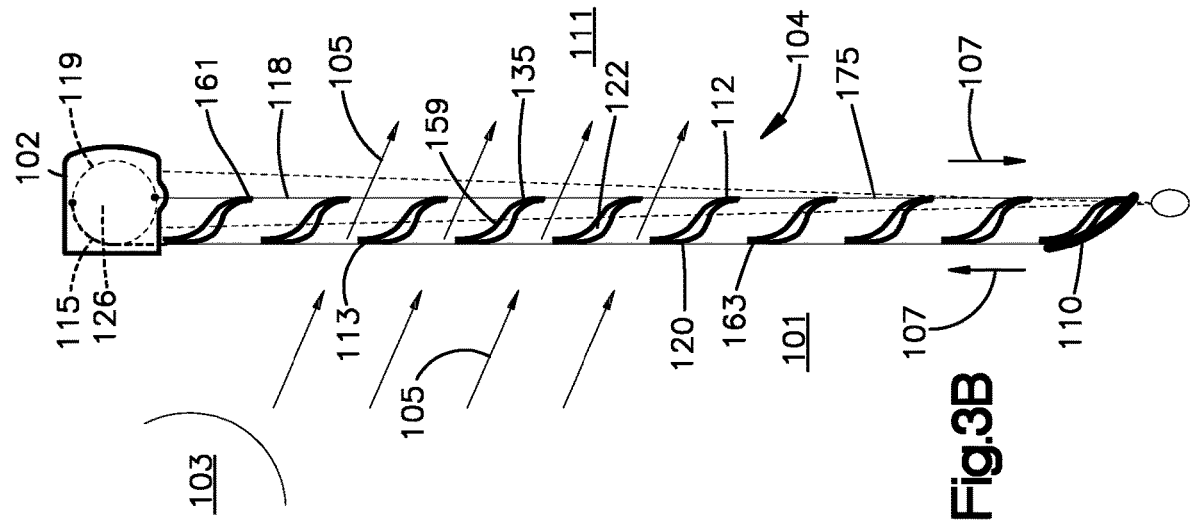
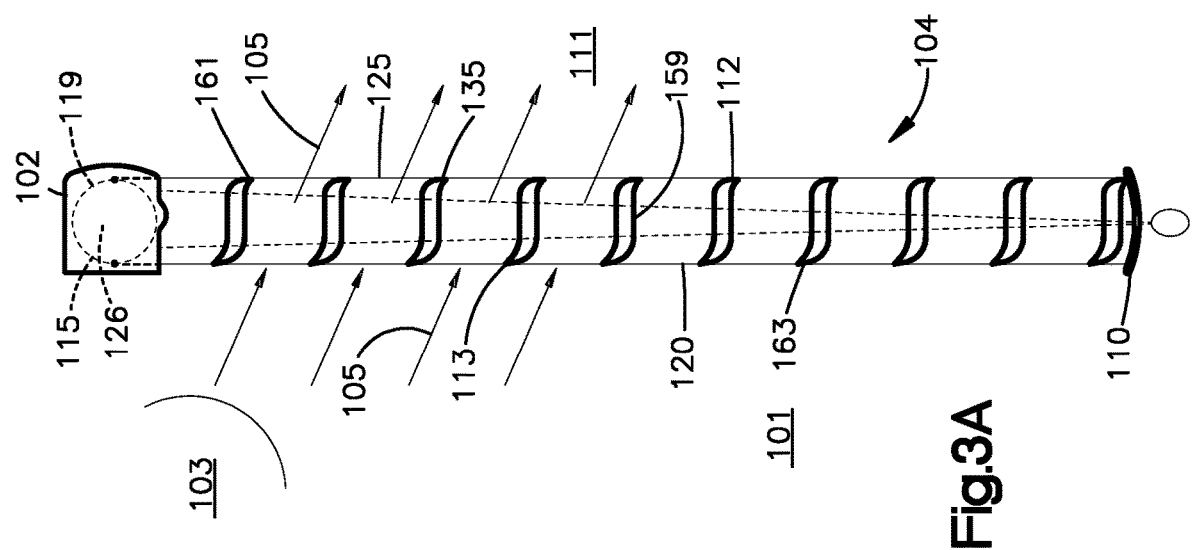

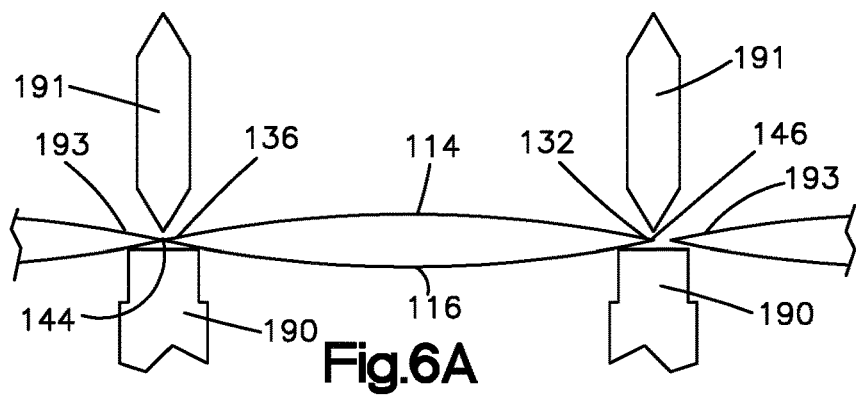
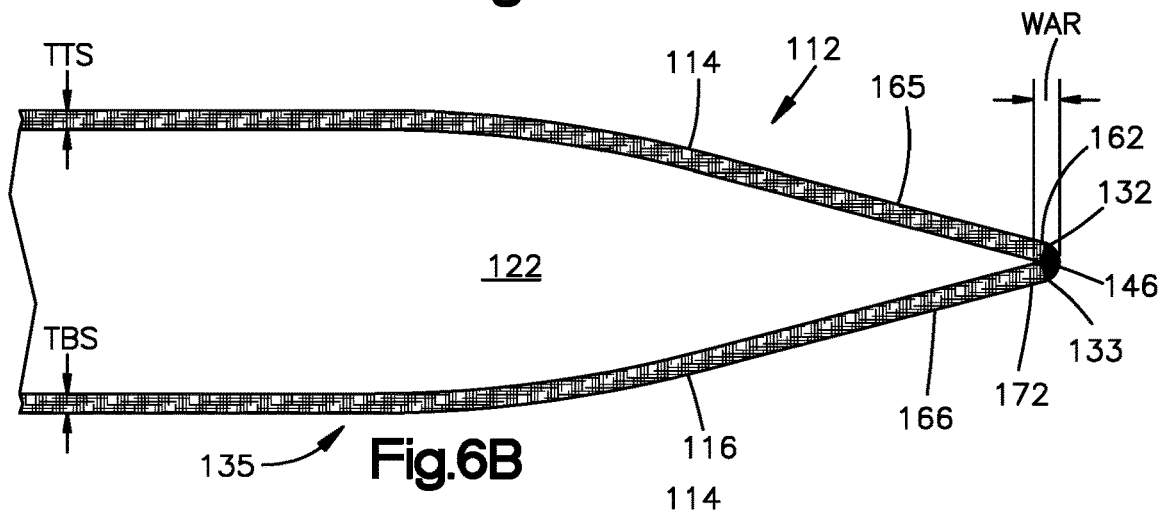
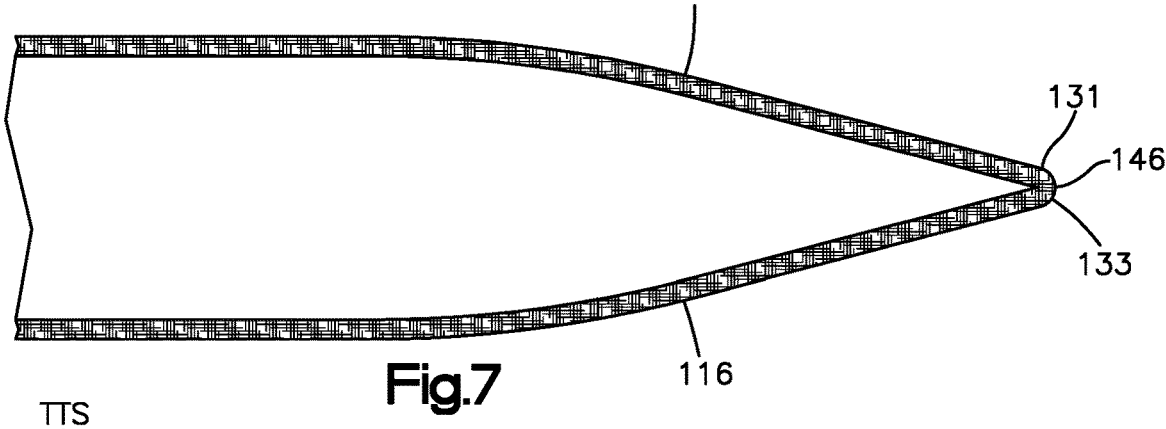
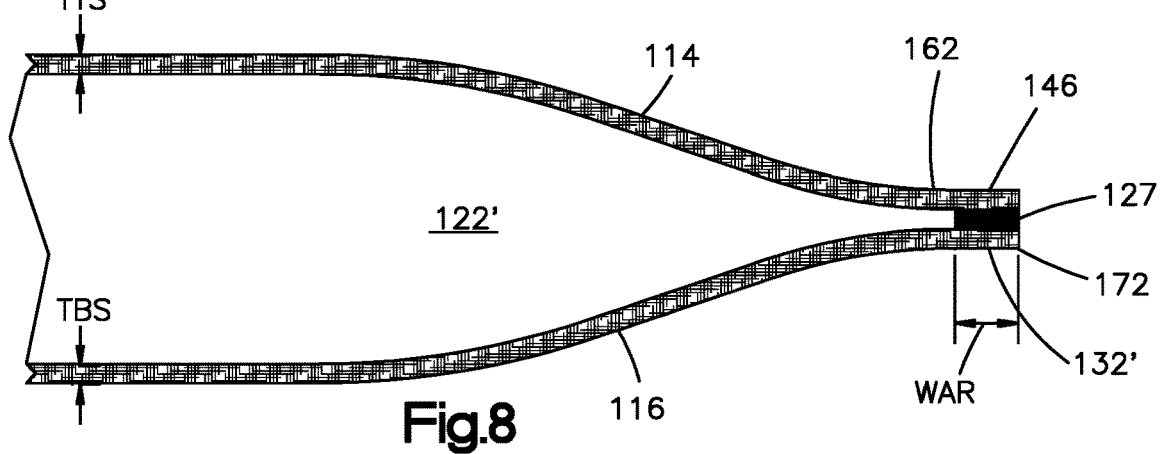

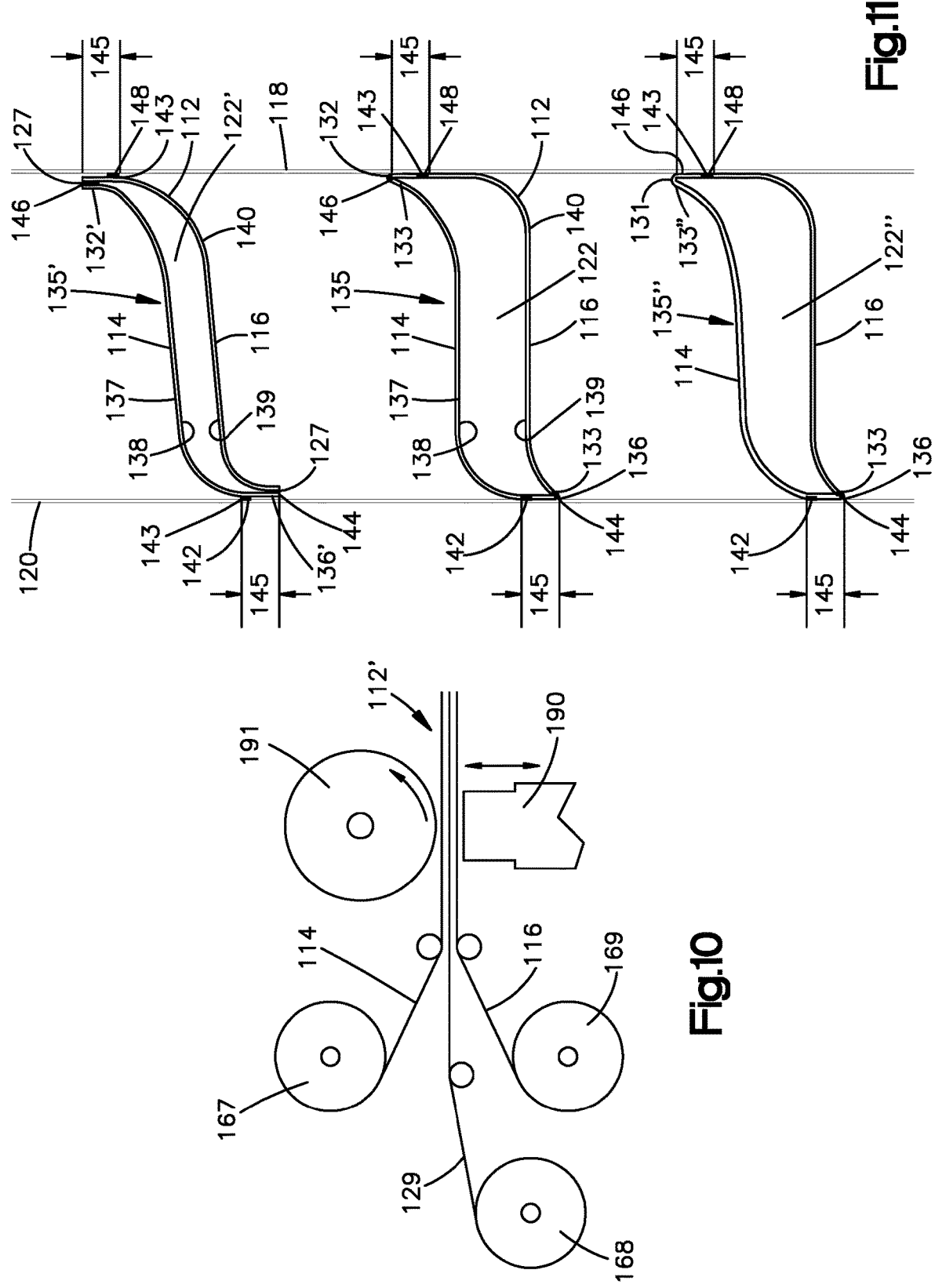

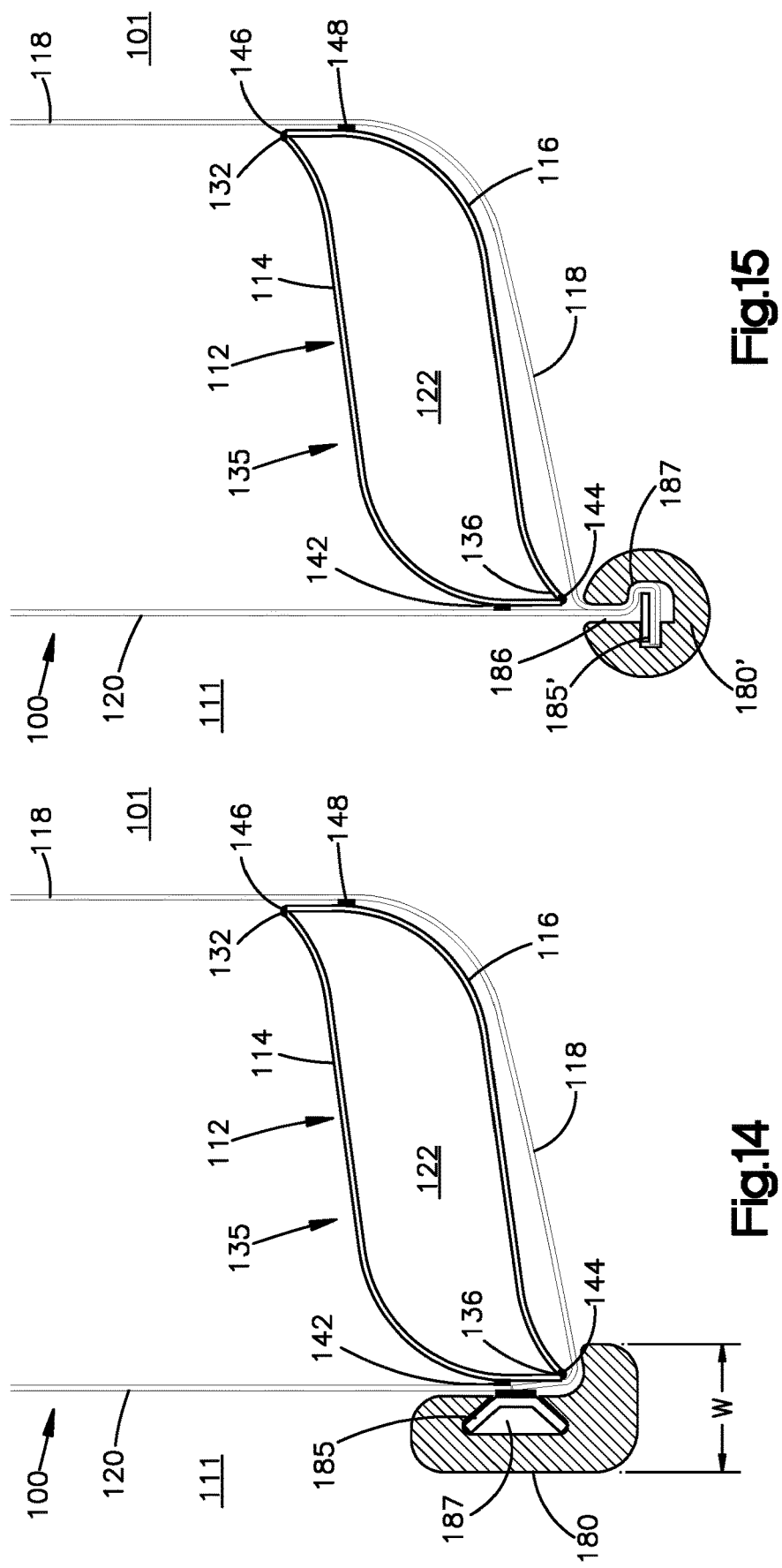

COVERING FOR ARCHITECTURAL FEATURES, RELATED SYSTEMS, AND METHODS OF MANUFACTURE

CROSS-REFERENCE TO RELATED APPLICATIONS

This application claims priority to U.S. Provisional Application No. 62/414,248, filed Oct. 28, 2016, and U.S. Provisional Application No. 62/525,549, filed Jun. 27, 2017, each of which is incorporated herein by reference in its entirety.

FIELD OF THE DISCLOSURE

The present disclosure relates to coverings for architectural features, which may include windows, doorways, archways and the like, and related systems, and methods of operation and manufacture. More particularly, the present disclosure relates to panels and/or coverings for architectural features having generally horizontal flexible vane elements coupled to one or more generally vertical support members, which provide light transmission and view-through controlling properties.

BACKGROUND OF THE DISCLOSURE

Current coverings for architectural features include sheer shadings sold under the brand name Silhouette® by Hunter Douglas, and as described in U.S. Pat. No. 5,313,999, which patent is hereby incorporated by reference herein in its entirety, which typically use generally vertical front and back sheets supporting generally horizontal substantially flexible vane elements. The vertical support sheets are generally flexible sheer fabrics. The vertical support sheets together with the substantially horizontal flexible vanes form a flexible or soft light-controlling window covering or panel. The flexible nature of the Silhouette® permits it to be operated by rolling and unrolling the flexible light-controlling panel about a roller, and may be referred to as a roll-up type covering. Typically, the sheer panels are made from materials that are clear or dyed white or off-white, and given their strength and durability requirements, result in a muted, somewhat milky view there through ("view-through"). The muted, milky view through is desirable for softening the light being transmitted through the covering, but in direct sun, full view through such sheer materials may be somewhat restricted.

The vanes in Silhouette® are single-layered materials and fabrics, and in certain orientations, these single-layer vanes create shadows on one another. United States published patent application No. 2014/0138037, filed on Mar. 14, 2013 and entitled "Coverings for Architectural Openings with Coordinated Vane Sets", hereby incorporated herein by reference in its entirety, discloses a flexible roll-up type window covering with dual-layered, generally horizontal vanes supported by generally vertical supporting members or sheets, which in certain positions and orientations may soften or reduce the shadow on the room-facing sheet.

It is desirable to have a light-controlling window panel with vanes that soften the transmitted light to a gentle glow, that provides better room-darkening attributes and view-through, and has a desirable aesthetic look.

SUMMARY OF THE DISCLOSURE

The present disclosure is directed to a person of ordinary skill in the art. The purpose and advantages of the architectural panel and covering will be set forth in, and be apparent from, the drawings, description, and claims that follow. The summary of the disclosure is given to aid understanding of the panel and covering, and not with an intent to limit the disclosure or the invention. It should be understood that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be utilized separately, or in combination with aspects and features of that embodiment or any other embodiment. In accordance with the present disclosure, variations and modifications may be made to the architectural panel or covering to achieve different effects.

The present disclosure features a covering for architectural features, which may include windows, doorways, archways and the like, where the covering may have a panel formed of generally horizontal vane elements coupled to generally vertical support members which provides unique dimensionality, richness, and versatility. The covering or panel may be light-controlling and is aesthetically appealing as well as practical. The panel has a height and a width and generally includes a generally vertical front support element or member having a height and width, and a generally vertical rear support element or member having a height and a width, where the generally vertical rear support member is operably coupled to the front support member. Additional generally vertical support members may be included in embodiments. In one embodiment, the front and/or rear vertical support member may be substantially planar and flat, preferably with no folds or creases formed therein, and the rear vertical support member may be substantially parallel to the front vertical support member. The panel may further include a plurality of generally horizontal vane elements extending between, and which may be coupled, directly or indirectly, to the front and rear vertical support members, and in one embodiment both the front and rear vertical support members may control the movement and angular orientation of the vane elements, and may be laterally moveable with respect to each other. The plurality of moveable, generally horizontally extending vane elements may be manipulated and controlled by the vertical support members to control the amount of light inhibited, blocked, or transmitted by or through the panel.

In one embodiment, the height and width of at least one, and preferably both, of the front and rear vertical support members is substantially the same as the height and width of the panel. Alternatively, or additionally, the plurality of horizontally extending vane elements have a length extending in the same direction as the width of the front and rear vertical support members, and the length of at least one, and preferably all, of the vane elements is substantially the same as the width of at least one, preferably all, of the vertical support members. In alternative embodiments, the support members may be elongated strips or tapes and the length of one or more vane elements may be greater than, preferably substantially greater than, the width of at least one of the vertical support members, the combined widths of the front vertical support members, and all of the combined widths of the rear vertical support members. The vane elements may be formed of any type of material, including in preferred embodiments at least one of the group of materials consisting of translucent, semi-opaque, and opaque materials and combinations thereof. The plurality of generally horizontally extending vane elements, and the front and rear vertical support members may be made from flexible materials to form a flexible panel, and in one embodiment the vane elements and support members may be formed of, for example, fabrics or films, including woven, non-woven, or knits. One or more, and in some embodiments all, of the vane elements are non-cellular vanes. Alternatively, or additionally, one or more, and in some embodiments all, of the vane elements may be multi-layered cellular vanes that may form a cavity, preferably a tube having a horizontally extending cavity, preferably a cavity that expands in response to the vertical support members being laterally separated.

The vertical support elements may be formed of any type of material, including, but not limited to fabrics, films, and the like, and in one embodiment are preferably formed of materials that have openings that permit visibility and light to pass there through. In one embodiment, in a flexible panel for an architectural opening, the front vertical support member may be a sheer and the rear vertical support member also may be a sheer. In one embodiment, the front and rear vertical support members may be two different sheer materials. In yet another embodiment, the rear support sheer has an openness factor greater than the openness factor of the front vertical support sheer, or vice versa. In a further embodiment, one or more of the sheers may have an openness factor as low as 60%, and as high as 90%, more preferably an openness factor greater than about 65%, more preferably one or more sheers may have an openness factor greater than 70%, greater than 75%, and more preferably greater than 80%, and may have an openness factor between about 80% to about 90%.

In some embodiments, one or more of the vertical support members may be a dark color, for example, black, gray, or brown. In an embodiment, the rear vertical support member may be a darker color than the other sheers, including the front sheer, or vice versa. Having vertical support members with high openness factors and dark colors may increase view-through, and enhanced visibility of the vane elements may be achieved in certain embodiments. Having darker colors also might increase the strength and durability of the support members as the material forming the support members may be less susceptible to UV degradation.

In an embodiment, the one or more vane elements may be a multi-layered structure having a top and bottom layer of material. The top and bottom layers may be formed of a single, integral, continuous sheet of material or multiple pieces of material. When extending between the front and rear generally vertical support members and operated as an architectural covering, the layers of the multi-layered vanes are moveable and may separate with respect to each other preferably to create cellular vanes that have walls that form generally horizontal, expandable tubes that circumscribe a space with open ends forming a longitudinal cavity, and which may be collapsible to form a generally two-dimensional flat slat. The volume of the cavity may increase as the front and rear vertical support members laterally separate further from each other and the volume of the cavity may decrease as the front and rear vertical support members move closer together.

In one embodiment, the panel includes a plurality of multi-layered vanes, each multi-layered vane having a flexible top layer and a flexible bottom layer. In one embodiment, the top and bottom layers may be formed from a separate top strip of material and a separate bottom strip of material. In yet another embodiment, the top layer of the multi-layered vane embodiment may have a different width than the bottom layer, and in one example, the bottom layer is larger than the top layer, or vice versa. In some embodiments, the vane elements may include a separate third layer, or more layers or strips, and in a further embodiment a third layer or strip may be a middle layer located between the top and bottom strip, and that middle strip or layer may be formed of a room-darkening material which blocks light transmission.

In one embodiment the top and bottom layers or strips of material forming the multi-layered vane may be coupled, preferably continuously, along the entire length of their edges in regions to form apexes and coupled regions, where the coupled regions are preferably thin, of narrow width, and flexible, and may serve as a flex point or hinge which may permit the middle section of the top and bottom strips to separate more easily from each other to form a three-dimensional cellular vane. In one embodiment, the coupled regions are of narrow width and may have a width that is about the thickness of the layers or less, and preferably has a width as large as about 1.0 mm or less, more preferably between about 0.5 mm to about 0.1 mm, depending upon the thickness of the vane layers. In one embodiment, the material of the top and bottom layers are fused in the coupled regions, and the coupled regions may be formed by welding, including, for example, ultrasonic welding or hot-knife welding. Each of the top and the bottom layers of the vane may be thinner in an area immediately adjacent to the first coupled region than in other areas spaced farther from the coupled regions. In embodiments at least one of the coupled regions may be formed by one of the group consisting of fusing the top and bottom layers together, adhesively bonding the top and bottom layers together, sewing the top and bottom layers together, and combinations of fusing, adhesively bonding, and sewing the top and bottom layers together, or other means of attaching or coupling, such as staples, pins and tacks.

In one embodiment, one or more multi-layered vanes may be formed of a single piece of material that may be configured, manipulated, folded, perforated, creased, and/or heat-set one or more times to create a top and bottom layer. In this embodiment, the side edge of the top layer of the multi-layered vane may be integral and formed of the same continuous sheet of material as the side edge of its respective bottom layer, the side edges forming an apex and fold line by at least one of the group consisting of folding, perforating, creasing, compressing, and heat-setting, and combinations thereof. The other side edge may be formed by fusing, adhesively bonding, sewing, or other means of coupling or attaching.

In embodiments, the vanes are associated with and/or coupled to the vertical support members at connection locations, and at least one of a first connection location (coupling one end of the vane) and the second connection location (coupling the other end of the vane) may be spaced from its respective, proximate first coupled region (or apex) by a first offset distance, and the other of the first and second locations may be spaced from its respective, proximate second coupled region (or apex) by a second offset distance. The offset distance between the first connection location and its respective proximate apex (or coupled region) may be different or the same as the offset distance between the second connection location and its respective proximate apex (or coupled region). In another aspect, at least one of the coupled regions (apexes) may be adjacent to one of the front or rear vertical support members, preferably the front vertical support member, and overlap with at least one of the first and second connection locations so there is no offset distance between the connection location and the coupled region (apex).

In another embodiment, by adjusting the relative length of the front and rear vertical support members, particularly the distance between the connection locations of the vanes to the front and rear vertical support members, vane closure for the covering and/or panel may be tightened and/or enhanced, particularly in a shading orientation, and the sequence of vane closure may be controlled.

The above embodiments of the panel may further include bottom rails, rollers, head rails, and control mechanisms to form a covering for an architectural feature. In embodiments, the covering may further include a bottom rail operatively associated with the bottom end of the panel, a movement mechanism to operate the roller, and/or a head rail to mount the roller. The covering in one embodiment may include a roller with the top end of the panel operatively associated with the roller. In yet another embodiment, a bottom rail may be associated with, preferably coupled to at least one of the rear vertical support member, the bottommost vane, and/or the front vertical support member preferably along a single region or line of the bottom rail which may further assist with vane closure.

Also disclosed is a method of forming a flexible panel, comprising (a) providing a top layer of material having a first and second side edge and a bottom layer of material having a first and second side edge; (b) coupling a respective top layer and a respective bottom layer along respective first side edges to form a vane having a first coupled region, wherein the first coupled region along the side edges has a width of about 1.0 mm or less; (c) providing a front sheer and a rear sheer; and (d) extending, and preferably coupling, the vane between the front sheer and the rear sheer to form the panel. The method may further include applying an adhesive to the vane, followed by coupling the vane to the sheers.

These and other features and advantages of the covering will be apparent from the following detailed description, and the scope of the invention should not be limited by the disclosure of the embodiments in the summary, but rather being set out in the appended claims where terms and phrases should be given their broadest interpretation unless indicated otherwise. The summary of the disclosure is given to aid understanding, and is directed to one of ordinary skill in the art who should understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be utilized or claimed separately, or in combination with aspects and features of that embodiment or any other embodiment.

In addition, the present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

The various aspects, features, and embodiments of the architectural covering as disclosed herein will be better understood when read in conjunction with the drawings provided. Embodiments are provided in the drawings for the purposes of illustrating aspects, features and/or various embodiments of the architectural covering, but the claims should not be limited to the precise arrangement, structures, subassemblies, features, embodiments, aspects, and devices shown, and the arrangements, structures, subassemblies, features, embodiments, aspects, and devices shown may be used singularly or in combination with other arrangements, structures, subassemblies, features, embodiments, aspects, and devices. The drawings are not necessarily to scale and are not in any way intended to limit the scope of the claims, but are merely presented to illustrate and describe various embodiments, aspects and features of the architectural covering to one of ordinary skill in the art.

FIG. 1B is a side view of the covering of FIG. 1A.

FIG. 1C is a front view of the covering of FIG. 1A.

FIG. 1D is a perspective view of the covering of FIG. 1A in the fully extended position with the multi-layered vanes in a closed or collapsed configuration.

FIG. 1E is a perspective view of the covering of FIG. 1A in a retracted position.

FIG. 3A is a side view of a different embodiment of a covering for an architectural opening with multi-layered vanes in an open configuration.

FIG. 3B is a side view of the panel of FIG. 3A, as the vanes transition from open to closed.

FIG. 6A shows an ultrasonic cut-seal and welding process to form a vane element.

FIG. 6B shows an enlarged partial view of one embodiment of the apex of a multi-layer vane element.

FIG. 7 shows another embodiment of the apex of a multi-layered vane element.

FIG. 8 shows another embodiment of the apex of a multi-layered vane element.

FIG. 10 shows an ultrasonic cut-seal and welding process to form a three-layered vane.

FIG. 11 shows a side elevation partial view of another embodiment of a covering having a cellular vane formed by adhesives, welding, and folding, where the differences have been exaggerated for purposes of illustration.

FIG. 14 shows a side elevation partial view of an embodiment of a covering having a bottom rail coupled to a light-controlling panel along one attachment location.

FIG. 15 shows a side partial elevation view of an embodiment of a covering having a different embodiment of a bottom rail coupled to a light-controlling panel.

DETAILED DESCRIPTION OF THE DISCLOSURE

Figure 1A:
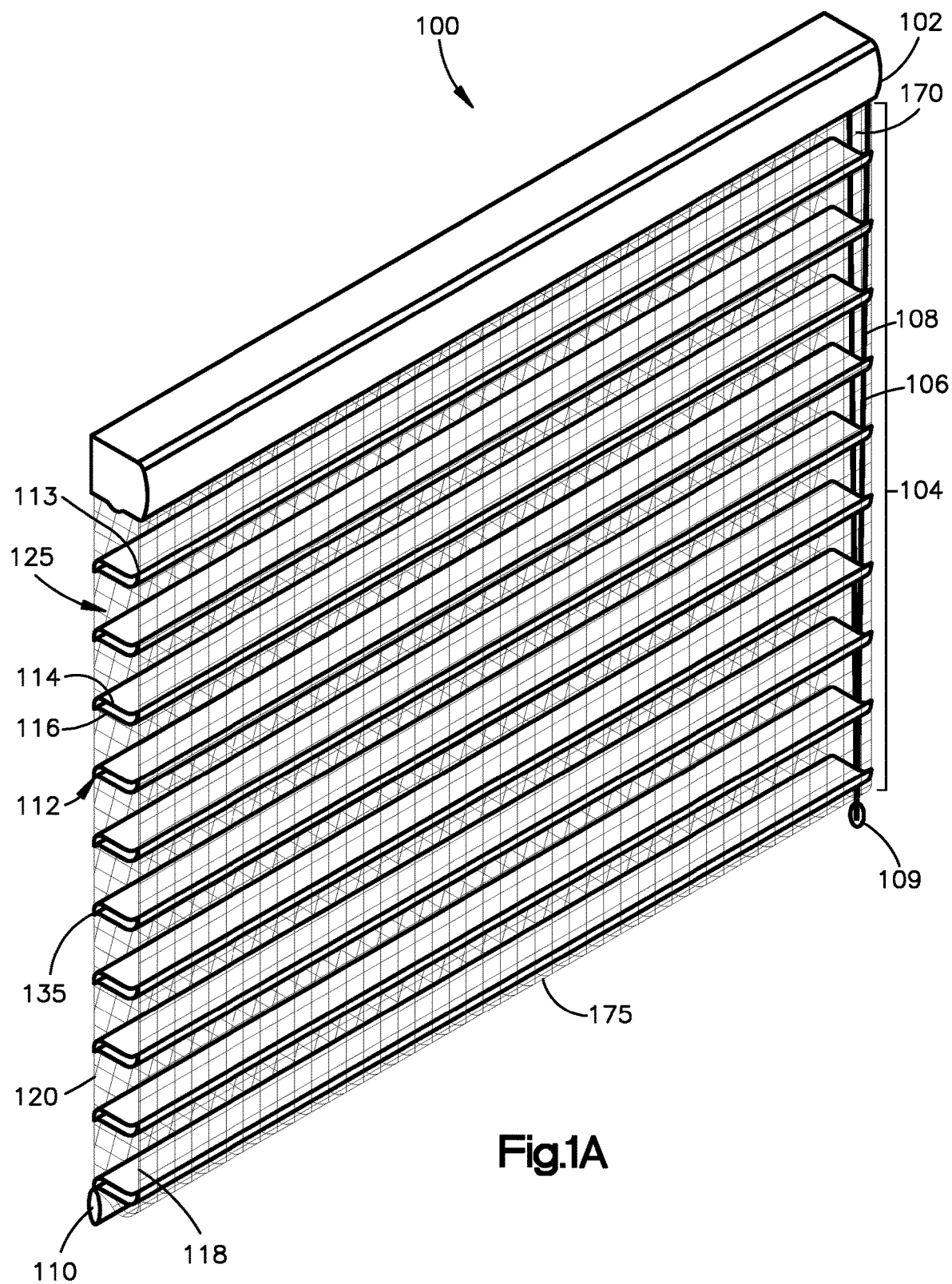
FIG. 1A is a perspective view of one embodiment of a covering for an architectural opening in the fully extended position with multi-layered vanes in an open configuration forming cells with gaps or spacing between the cells.

In the following detailed description, numerous details are set forth in order to provide an understanding of an architectural covering, its method of operation, and method of manufacture. However, it will be understood by those skilled in the art that the different and numerous embodiments of the architectural covering, and its method of operation and manufacture may be practiced without these specific details, and the claims and invention should not be limited to the embodiments, subassemblies, or the specified features or details specifically described and shown herein. The description provided herein is directed to one of ordinary skill in the art and in circumstances, well-known methods, procedures, manufacturing techniques, components, and assemblies have not been described in detail so as not to obscure other aspects, or features of the architectural covering.

Accordingly, it will be readily understood that the components, aspects, features, elements, and subassemblies of the embodiments, as generally described and illustrated in the figures herein, can be arranged and designed in a variety of different configurations in addition to the described embodiments. It is to be understood that the covering may be used with many additions, substitutions, or modifications of form, structure, arrangement, proportions, materials, and components which may be particularly adapted to specific environments and operative requirements without departing from the spirit and scope of the invention. The following descriptions are intended only by way of example, and simply illustrate certain selected embodiments of an architectural covering. For example, while the architectural covering is shown and described in examples with particular reference to its use as a window covering to control light and view-through, it should be understood that the covering will have other applications as well. In addition, while the detailed description in many examples is generally directed to a covering formed of generally vertical supporting members described as sheets and particularly sheer sheets, it will be appreciated that the disclosure and teachings have application to other materials forming the vertical support members, such as, for example, tapes, strips, sheets, panels, and combinations thereof. Furthermore, while some embodiments and many examples disclose horizontal light controlling elements, referred to herein as vanes or slats, including the use of multi-layered vanes which preferably form multi-layered cellular vanes, it will be appreciated that the disclosure and teaching have application to non-cellular and/or single layered horizontal light controlling members. The claims appended hereto will set forth the claimed invention and should be broadly construed to cover architectural coverings, unless otherwise clearly indicated to be more narrowly construed to exclude embodiments, elements and/or features of the covering and/or light-controlling panel.

Throughout the present application, reference numbers are used to indicate a generic element or feature of the covering. The same reference number may be used to indicate elements or features that are not identical in form, shape, structure, etc., yet which provide similar functions or benefits. Additional reference characters (such as letters, primes, or superscripts, as opposed to numbers) may be used to differentiate similar elements or features from one another. It should be understood that for ease of description the disclosure does not always refer to or list all the components of the covering, and that a singular reference to an element, member, or structure, e.g., a singular reference to a generally vertical support member, a horizontal vane element, or a strip or a vane, may be a reference to one or more such elements, unless the context indicates otherwise.

In the following description of various embodiments of the architectural covering, it will be appreciated that all directional references (e.g., proximal, distal, upper, lower, upward, downward, left, right, lateral, longitudinal, front, rear, back, top, bottom, above, below, vertical, horizontal, radial, axial, interior, exterior, clockwise, and counterclockwise) are only used for identification purposes to aid the reader's understanding of the present disclosure unless indicated otherwise in the claims, and do not create limitations, particularly as to the position, orientation, or use in this disclosure. Features described with respect to one embodiment typically may be applied to another embodiment, whether or not explicitly indicated.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings may vary.

General Operation of the Covering

The present disclosure relates to coverings for architectural features which include, for example, windows, door frames, archways, and the like. The coverings are particularly useful for windows to provide an aesthetic look, and desirable shading and privacy. The coverings generally comprise a flexible subassembly or panel that includes one or more moveable generally horizontal vane elements extending between generally vertical front and rear support members. The generally horizontal vane elements, also referred to as vanes or slats herein, preferably have a different light transmissivity or translucence than the generally vertical support members, and the vanes and support members together control view-through and light transmission through the covering. The shape and angular orientation of the vanes can be controlled by moving the support members laterally and vertically with respect to each other. In particular, the vane elements can be adjusted, for example, rotated or pivoted, between different angular orientations from generally horizontal and substantially perpendicular to the vertical support members to vertical and substantially parallel to the vertical support members in order to provide and control light, view-through, shading effect and/or privacy to the room.

The generally vertical support members may be substantially parallel to each other and may not have any fold lines, creases and the like. The generally vertical support members may include, for example, sheets, panels, tapes, strips, or the like, and combinations of these elements. Each vertical support member may be formed of a single or multiple piece(s) of material, and may be substantially flat and planer. The vertical support members have a height (length), width and thickness, their thickness (generally perpendicular to their height and width) may be relatively thin, and the vertical support members generally are made of materials that are much thinner than their respective length (height) and/or width. The "height" of the vertical support members, also referred to as the "length", generally and typically corresponds to and is associated with the height or vertical dimension of the covering or panel, while the width of the vertical support members generally and typically corresponds to the width of the covering or panel, and the width of the architectural opening. The width of the vertical support members may or may not extend the length of the vane elements. In one embodiment the height and width of the front and/or rear vertical support member is substantially the same as the height and width of the panel. For ease of reference and without intent to limit the disclosure, the vertical support members sometimes will be referred to in the disclosure as sheets, and in one embodiment, the front and rear vertical support members are formed of sheets.

The vane elements may be formed from and include, for example, strips, tapes, panels, and the like. Each vane element may be formed of a single or multiple piece(s) of material, e.g., strips, tapes or panels. The vane elements may be single layered or multi-layered. Generally, but not necessarily, the vane elements extend in the horizontal direction and have a length that is larger than its width. The length of the vane elements generally corresponds to the width of the covering. The vane elements have a thickness (generally perpendicular to their length and width) and their thickness may be relatively thin, and generally are made of materials that are much thinner than their respective length and/or width. For ease of reference, and without intent to limit the disclosure, the vane elements sometimes will be referred to in the disclosure as vanes or slats.

The front and rear generally vertical support members, and the vane elements, may be substantially any type of material, and are preferably formed from flexible materials, such as, but not limited to, textiles, fabrics, and films, including knits, wovens, non-wovens, and so on. For ease of reference, the subassembly or combination of sheets and vanes sometimes will be referred to as a light-controlling panel, subassembly, or "panel" for short. In one exemplary embodiment, the generally horizontal vane elements are made from generally flexible, soft materials, and the generally vertical support members are also made from generally flexible, soft materials, and together form a generally flexible subassembly or panel for the covering.

Additionally, the vertical support members and vanes may have varying light transmissivity properties, varying from blackout, opaque, partially opaque, translucent, transparent, or clear. In some embodiments, the supporting members may have higher light transmissivity compared to the vane elements, so when the vanes are moved, e.g., pivoted between open and closed positions, the light transmissivity or translucence in the covering may be varied. In one embodiment, the front and rear supporting members are sheers and/or materials that permit light to pass there through, and the vane elements are translucent, semi-opaque, opaque, and/or room-darkening materials or combinations thereof.

Referring generally to the illustrative embodiments of FIGS. 1A-1E, FIGS. 2A-2C, and FIGS. 3A-3B, the covering 100 in one embodiment generally includes a headrail 102, a roller 126 associated with the head rail, a light-controlling panel 104, a bottom rail or weight 110, and a mechanism 106 to operate the covering (e.g., a mechanism to rotate the roller) and control the amount, quality, and manner in which light is blocked or transmitted through the panel, as well as the aesthetic look and appearance of the panel. In one embodiment, a head tube or roller 126 supports and is connected to a top end 170 of panel 104, and bottom rail 110 is connected to a bottom end 175 of panel 104. In one embodiment, the front and read vertical support members are coupled directly or indirectly to the roller, and preferably at different horizontally extending locations along the circumference of the roller to provide lateral movement of the front and rear vertical support members relative to each other. Head rail 102 may support the roller 126 and the panel may be connected to roller 126 over an architectural opening, and thus head rail 102 may generally correspond to the shape and dimensions (e.g., width) of the top of the architectural opening. Panel 104 includes generally horizontal vanes 112 extending between a generally vertical front support member 118 and a generally vertical rear support member 120. In one embodiment, the generally horizontal extending vanes 112 are coupled to generally vertical front support member or sheet 118 and coupled to generally vertical rear support member or sheet 120. Without limiting the application of the panel, front support member 118 may be a front sheer that faces the interior 111 of the architectural opening and rear support member 120 may be a rear sheer that faces the exterior 101 of the opening. Vanes 112 extend from and between, and may be coupled to, front and rear support members 118, 120, and move between a first or open position where at least a middle portion of the vanes are substantially horizontal and generally orthogonal to the front and rear support members and a second or closed position where at least a middle portion of the vanes are substantially vertical and generally parallel to the front and rear support members. In one embodiment, the generally vertical support members 118, 120 are substantially parallel to each other whether the vane elements are in an open or closed position, and the generally vertical support members may have no fold lines, creases, or the like.

Covering 100 may include a mechanism 106 for controlling the retraction, and extension of light-controlling panel 104 to control the height of the covering in the opening and hence the nature and quality of the light transmitted through, the view-through characteristics, and the shape and aesthetic nature of panel 104. The movement or control mechanism may also control the angular orientation of horizontal vane elements 112 with respect to support members 118, 120 which will also affect the nature and quality of the light transmitted through, the view-through characteristics, and the shape and aesthetic appeal of the panel 104. In the rollup-type window covering illustrated in FIGS. 1A-1E and 3A-3B, the movement or control mechanism 106 preferably rotates roller 126. In particular, movement mechanism 106 may rotate roller 126 in order to retract, extend, or angularly orient vanes 112 of light-controlling panel 104. The light-controlling panel may move between a fully retracted position where the panel is completely wrapped about the roller, and a fully extended position where the panel is completely unwound from the roller and general extends in the opening with the vertical support members generally parallel and adjacent to each other with the vanes located between the support members and oriented substantially vertical and parallel to the vertical support members (see FIG. 1B). In one example, movement mechanism 106 may include a cord 108 for rotating the roller, and/or may include a pulley 109, a direct drive arrangement, a gear train, and/or a clutch mechanism. The system or mechanism for controlling the rotation of roller 126 may include an electric motor which may be controlled manually by a user, or through a pre-programmed or programmable software control unit, such as a remote control. Movement or control mechanism may include any desired movement mechanism including those now known and movement mechanisms developed in the future. In addition, while movement mechanisms discussed above are directed primarily to rotating a roller or mechanisms for a roll-up type covering, it will be appreciated that other arrangements and mechanisms now known or later developed, for example, mechanisms for stacking and folding arrangements, and/or lifting of the bottom rail may instead be used to control movement of the panel 104.

For ease of reference purposes, when used, for example, as a window covering, the generally vertical support member 120 that faces the exterior 101 of the window opening is referred to as the rear support member or sheet, while the generally vertical support member 118 that faces the interior 111 of the window opening is referred to as front support member or sheet 118. The vanes of the window covering may extend between the vertical support members in different manners so as to orient the vanes in different angular orientations or directions and configure them to operate or move in different directions and orientations to effect the amount of light transmitted through the panel and/or the visibility through the covering. In a first orientation, referred to as the shading orientation, the vane 112 extends from the front support member 118 and is operable to extend between positions where the middle portion 159 of vanes 112 extend generally horizontal toward rear support member 120 (shown in FIG. 1A) and/or extend from front support member 118 downwards towards rear support member 120 (shown in FIGS. 2B and 2C). Generally, in a shading orientation, portion 158 of the vane that extends from the rear support member is at the same height or lower than portion 113 of the vane proximate the front support member. As such, in the shading orientation, depending upon the angular orientation of vane elements 112, sunlight entering the covering through rear support member 120 may encounter vane elements 112, which, depending upon the opacity of the vane material, may block or diffuse light that passes through rear support member 120.

In a second orientation, referred to as the privacy orientation, vane 112 extends from rear support member 120 and is operable to extend between positions where the middle portion 159 of vanes 112 extend generally horizontal toward front support member 118 (shown in FIG. 3A) and/or extend from rear support member 120 downward towards front sheet 118 (shown in FIG. 3B). Generally, in a privacy orientation portion 161 of the vane that extends from the front support member is at the same height or lower than portion 163 of the vane proximate the rear support member. In the privacy orientation, a person under the window and looking up may be blocked from viewing into the room due to vanes 112 blocking their view-through. In this privacy orientation, sunlight 105 entering through rear support member 120 from a light source 103 (the sun) is transmitted through gaps or spaces 124 between vanes 112 (shown in FIG. 2B).

Figure 2A:
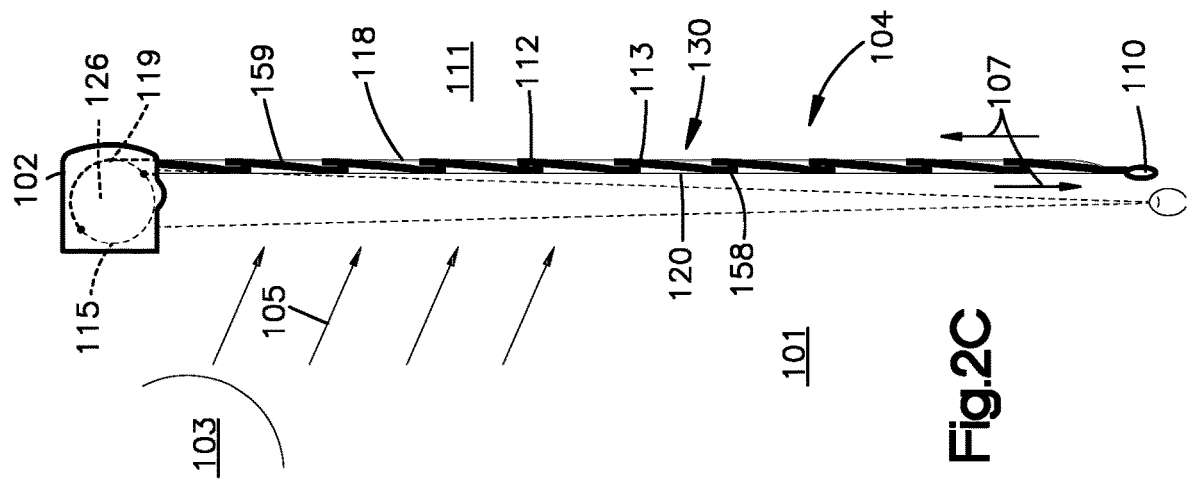
FIG. 2A is a side view of an embodiment of a covering showing light transmission.
Figure 2B:
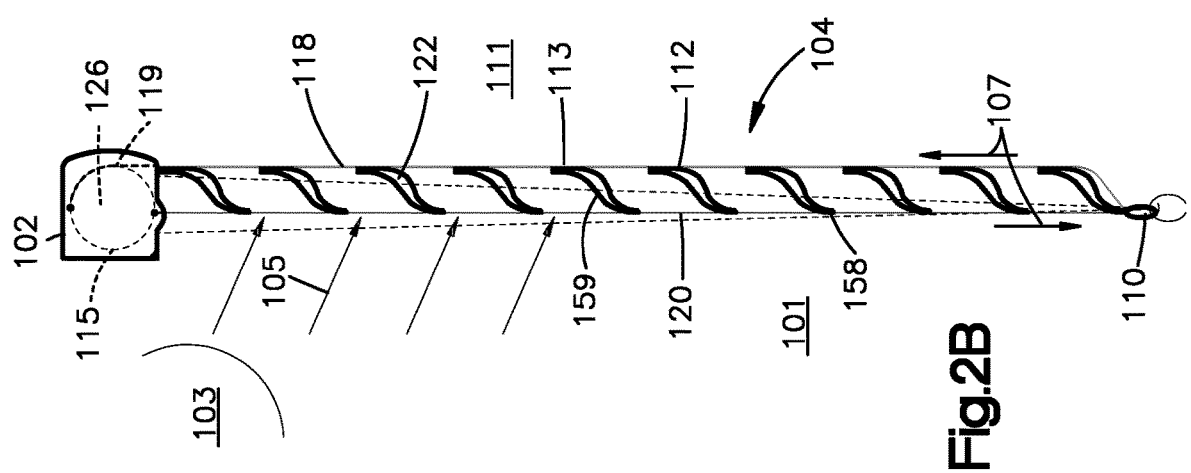
FIG. 2B is a side view of the covering of FIG. 2A where the vanes are in a partially closed position.
Figure 2C:
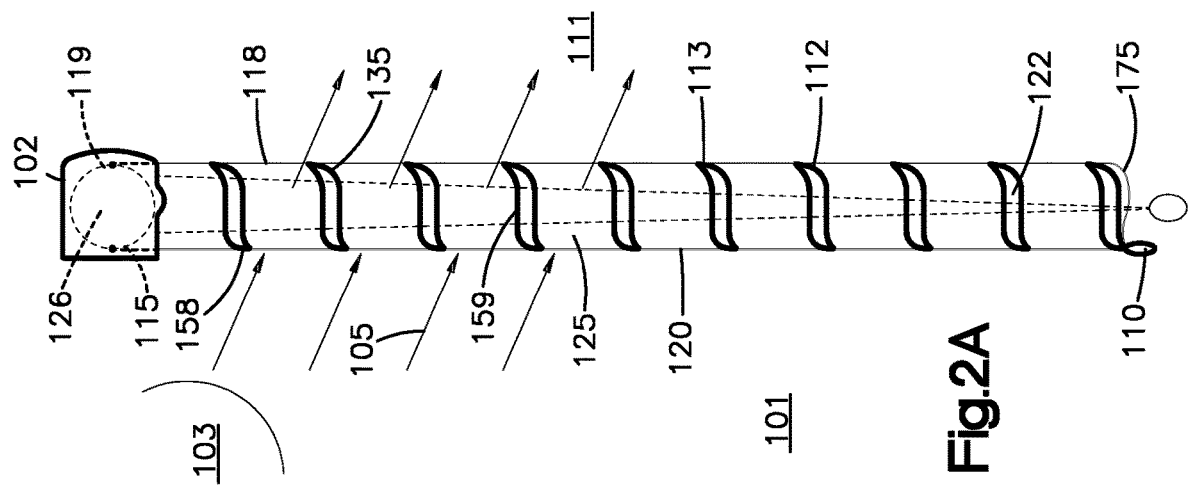
FIG. 2C is a side view of the covering of FIG. 2A where the vanes are in a closed position.

The angular orientation and movement of vanes 112, in a roll-up type covering having vanes 112 extending between and coupled to vertical support members, is effected by relative movement of the support members. Front and rear support members 118, 120 may move vertically in unison as they are unrolled from roller 126 (FIG. 1E) to extend in the window opening. After the window covering is fully extended and unrolled from roller 126 (shown in FIG. 1D), further rotation of roller 126 moves front support member 118 and/or rear support member 120 laterally or horizontally away from each other, and further moves front and rear support members 118, 120 in relative vertically opposite directions (FIGS. 2B, 2C, 3B). This vertically opposite directional movement 107 of front and rear support members 118, 120 relative to each other pivots or rotates vanes 112 between the support members. The relative vertical motion 107 of the support members can be any combination of vertical motion by one or more of front support member 118 and back support member 120 relative to each other. The relative vertical motion 107 of the support members may include front support member 118 moving up or down relative to the substantially stationary back support member 120; back support member 120 moving up or down relative to the substantially vertically stationary front support member 118; or front support member 118 and back support member both moving vertically in opposite directions relative to each other. This pivoting or rotational movement of vanes 112 controls the angular orientation of vanes 112 relative to front and rear support members 118, 120, and, with other factors, the shape of vanes 112.

One skilled in the art can also appreciate that generally the light-controlling and view-through characteristics including the angular orientation and relative movement of vanes 112 in a roll-up type covering, may be affected by whether the support members extend from the rear side 115 or front side 119 of the roller and/or the direction of rotation of the roller. If the window covering rolls up and down from front side 119 of roller 126 as in FIGS. 2B and 2C, then when support members 118, 120 are first retracted from a fully extended position, front support member 118 will be raised vertically upward as rear support member 120 lowers and moves laterally toward front support member 118 (see FIG. 2B). This relative movement of front and rear support members 118, 120 rotates or pivots vanes 112 to change their angular orientation relative to front and rear support members 118, 120 so that vanes 112 extend downward from front support member 118 toward rear support member 120 and are in a shading orientation as shown in FIGS. 2B and 2C. If the window shading, however, rolls up-and-down from rear side 115 of the roller as shown in FIG. 3B, then when support members 118, 120 are first retracted from a fully extended position, rear support member 120 will be raised vertically upward as front support member 118 lowers and moves laterally towards rear support member 120. This movement of the front and rear support members rotates or pivots the vanes to change their angular orientation relative to the front and rear support members so that the vanes extend downward from the rear support member towards the front support member and are in the privacy orientation as shown in FIGS. 3A and 3B. Accordingly, the direction of roll-up about the roller or head tube, whether clockwise or counterclockwise and around the front side or rear side of the roller, may effect whether the covering operates in a shading or privacy orientation.

The Vane Elements

Figure 13:
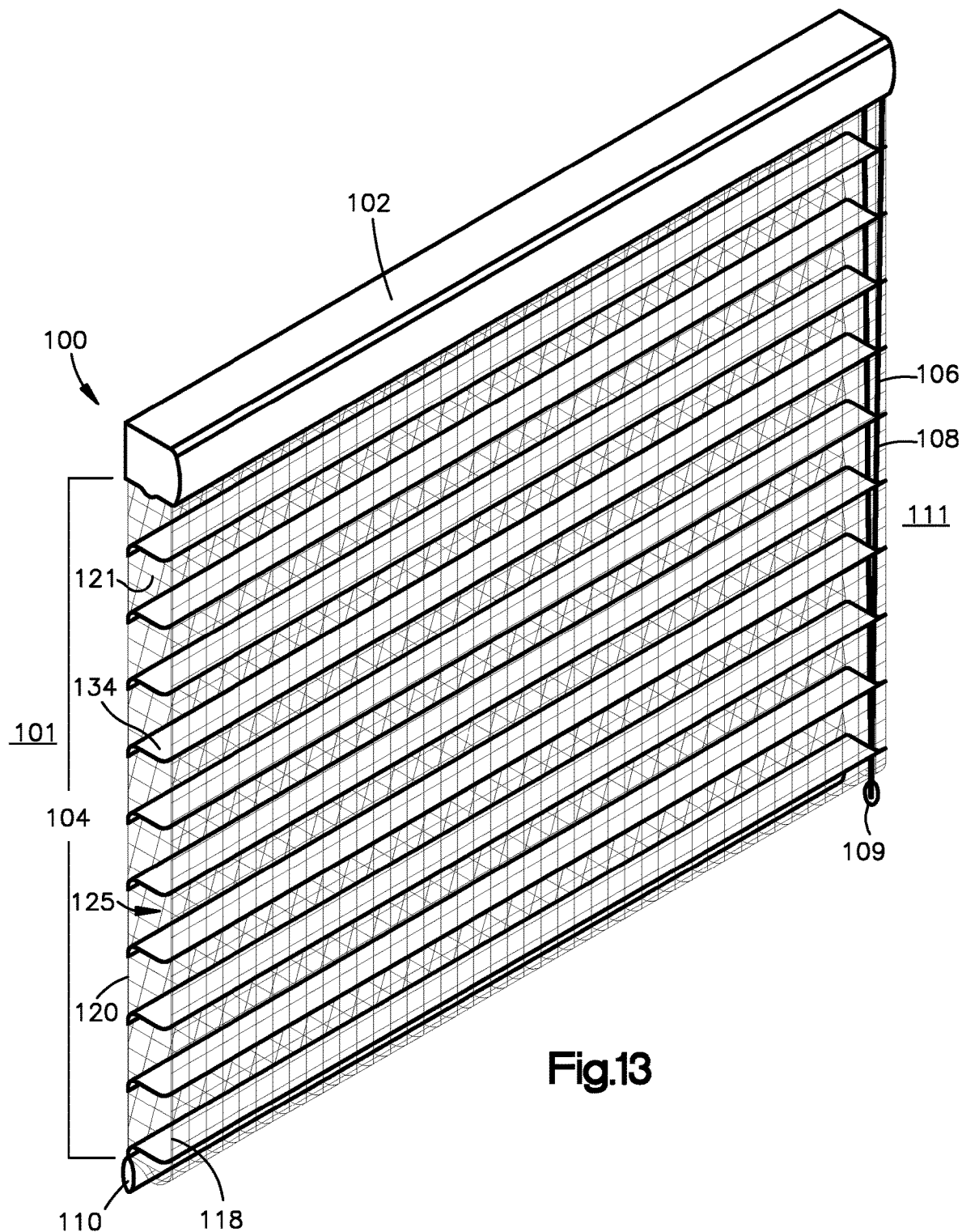
FIG. 13 is a perspective side view of a different embodiment of an architectural covering with single layered non-cellular vanes.

While portions of the disclosure describe multi-layered vanes that are assembled in a light-controlling panel to form cellular multi-layered vanes during operation of the panel, it will be appreciated that the panel may be formed of one or more, or entirely of single or multi-layered non-cellular vanes as shown in FIG. 13. As shown in FIGS. 1A-1B, 2A-2B and 3A-3B, some embodiments of the covering have two generally parallel, vertical support members or sheets 118, 120 and a plurality of multi-layered vanes 112 extending between the generally vertical support members that form cells 122 that change volume depending upon the position of generally vertical support members 118, 120. The lateral and vertical movement of support members 118, 120 controls the shape and angular orientation of multi-layered vanes 112. As a result, multi-layered vanes 112 change between a closed generally flat multi-layered slab 130 (see FIGS. 1D and 2C) and an open three-dimensional cellular vane 135 (see FIGS. 1A-1B, 2A and 3A). Depending upon the material(s) used in, and the manner in which panel 104 is configured and constructed, cells 122 formed by multi-layered vanes 112 may be opened and closed, and their volume changes, by movement of sheets 118, 120, which also may vary the light transmissivity and view-through of panel 104.

When cells 122 are closed or substantially closed, each cell 122 may be substantially compressed and the materials forming multi-layered vanes 112 may be substantially parallel with each other and substantially parallel with each of the generally vertical support members or sheets 118, 120 as shown in FIGS. 1B, 1D and 2C. In some embodiments, vanes 112 may be adjacent to one another or partially overlap when in a closed position where the cells have been compressed so that vanes 112 may form a pseudo-middle sheet 130 positioned between front and rear support member or sheets 118, 120 (see generally FIGS. 1D and 2C). When cells 122 are compressed and closed, the vanes 112 are angularly oriented to be substantially vertical, and depending upon their translucence and opacity, may substantially block view-through and light transmission. In some embodiments, there may be a gap between adjacent vanes when they are in a closed position such that light or visibility through the gaps between the adjacent vanes may be possible.

When vanes 112 are positioned so that cells 122 are open or at least partially open, the middle portion 159 of each vane 112 may be traverse to and generally substantially perpendicular (see FIGS. 1A-1B, 2B and 3A) or angled (See FIGS. 2B and 3B) with respect to at least one of sheets 118, 120. Multi-layered vanes 112 when open or partially open preferably form walls that completely surround, circumscribe and enclose a space or cell 122 with open ends. That is, multi-layered vanes 112, when open, preferably form a horizontally extending tube that has walls that circumscribe entirely the space or cell 122, and may or may not have open ends. Vanes 112 may be independently formed and separately coupled to support members or sheets 118, 120 adjacent and spaced from each other so that the vanes do not share a common wall or material with another vane. The vanes may be coupled to one of the front or back sheets at a generally singular location or region and extends generally away from that sheet and may be coupled to the other of the front or back sheet at a generally singular location or region. Gaps or spaces 125 may be formed between adjacent vanes 112 such that, for example, the adjacent cellular vanes are separated by a length of the front and rear vertical support members. Gaps 125 may provide view-through and permit light transmission through the panel. In an open configuration, vanes 112 form cells 122 that may provide insulation by trapping air in each cell 122, as well as trapping air in gaps 125 formed by the front and rear supporting members and between adjacent sets of vanes 112.

Multi-layered cellular vanes 112 may reduce or diffuse shadows created by the structure of covering 100 on one side from being as noticeable on the other side of covering 100. In other words, shadow lines due to light encountering structures of the covering or due to light encountering articles (e.g., debris) on an outer side 101 of the panel, whether or not at a particular angle of incidence, may be reduced as viewed from an interior side 111 of the covering.

Figure 9:
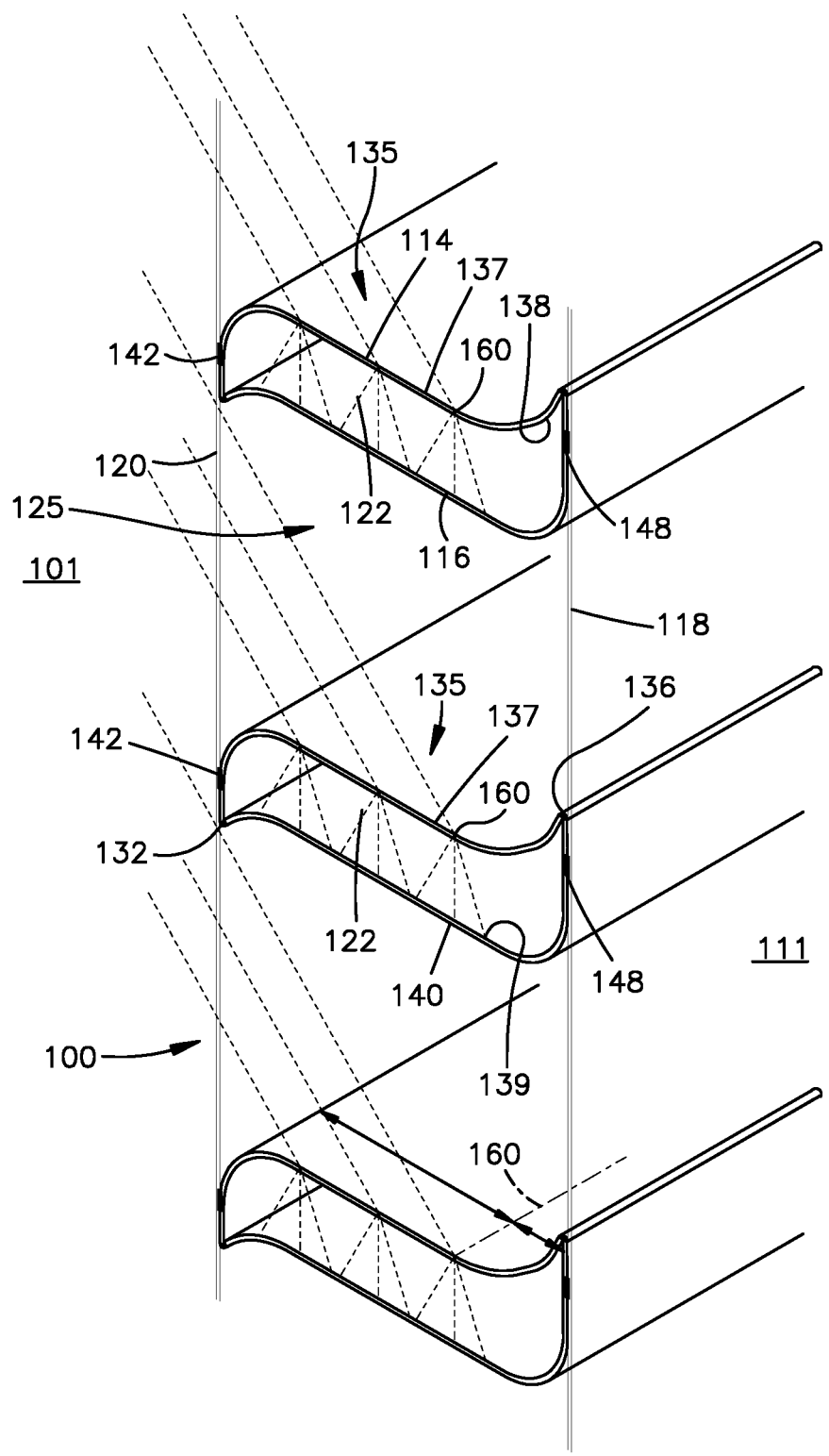
FIG. 9 is a perspective partial side view of an embodiment of a covering showing a schematic illustration of light diffusion through the cellular vane.

Because vanes in a shading orientation primarily have sun hitting them from the backside, transmitted, rather than reflected, light enters the room. As shown in FIG. 9, one potential advantage of a multi-layered cellular vane is light transmittance and diffusivity as the light hitting exterior surface 137 of the top layer of vane material will be dispersed and transmitted in different directions in cavity 122 of vane 112 and will be further dispersed or muted upon leaving the bottom layer of vane material. More specifically as shown in FIG. 9, with covering 100 in a shading orientation, upper or top multi-layered vane 135 partially blocks light from directly contacting lower cellular vane 135. As such, there is a sharp demarcation line 160 on top layer 114 of the lower cellular vane 135 between where light directly contacts lower cellular vane 135 and where light is blocked from directly contacting lower cellular vane 135. Yet no visible, sharp demarcation line is seen from the interior 111 on bottom layer 116 of lower cellular vane 135 because of the diffusive nature of cellular vane 135. Instead, outer surface 140 of bottom layer 116 of cellular vane 135 is darker toward front sheet 118 and becomes gradually lighter as bottom layer 116 approaches rear sheet 120. With single-layer vanes formed of translucent material, the transmission of light on an interior side 111 of the vane may be quite harsh and distinct, often resulting in sharp demarcation lines between dark and light portions of the vane. But with a cellular vane, the multi-layers of material and cellular space between the layers will soften the transmitted light to a gentle glow. Further, this gentle glow of transmitted light from a light-controlling panel with multi-layered cellular vanes, particularly in the shading orientation, may highlight the texture of the vane much better than reflected light does. In this manner, multi-layered vanes provide a smooth and soft look through the front sheet facing the room in a shading orientation.

In one embodiment of the covering, one or more of vanes 112 may be multi-layered and include a top layer of vane material 114, also referred to as top strip 114, made of flexible material, and a bottom layer of vane material 116, also referred to as bottom strip 116, made of flexible material. In one embodiment, the multi-layered vane 112 may be formed of separate top strips 114 and separate bottom strips 116, each having two side edges defining a width and two ends defining a length, which may be coupled and interconnected to each other along their two respective side edges (and may remain uncoupled along the ends and/or in the middle region) to form a predominantly flattened tube or multi-layered vane 112 that will be coupled to the vertical support members. In a different embodiment, the multi-layered vanes may be formed of a single piece or sheet of material that may be folded, perforated, folded over, and creased, and/or folded over, creased, and heat set to form a fold line where the sheet is folded over to form a top strip or layer and a bottom strip or layer. The two side edges of the folded over sheet of material may be aligned, coupled, and interconnected together along the two longitudinal edges (and may remain unconnected at the ends and/or in the middle region) to form a generally horizontally extending predominately flattened tube or multi-layered vane 112 that may be coupled to the vertical support members.

Figure 4:
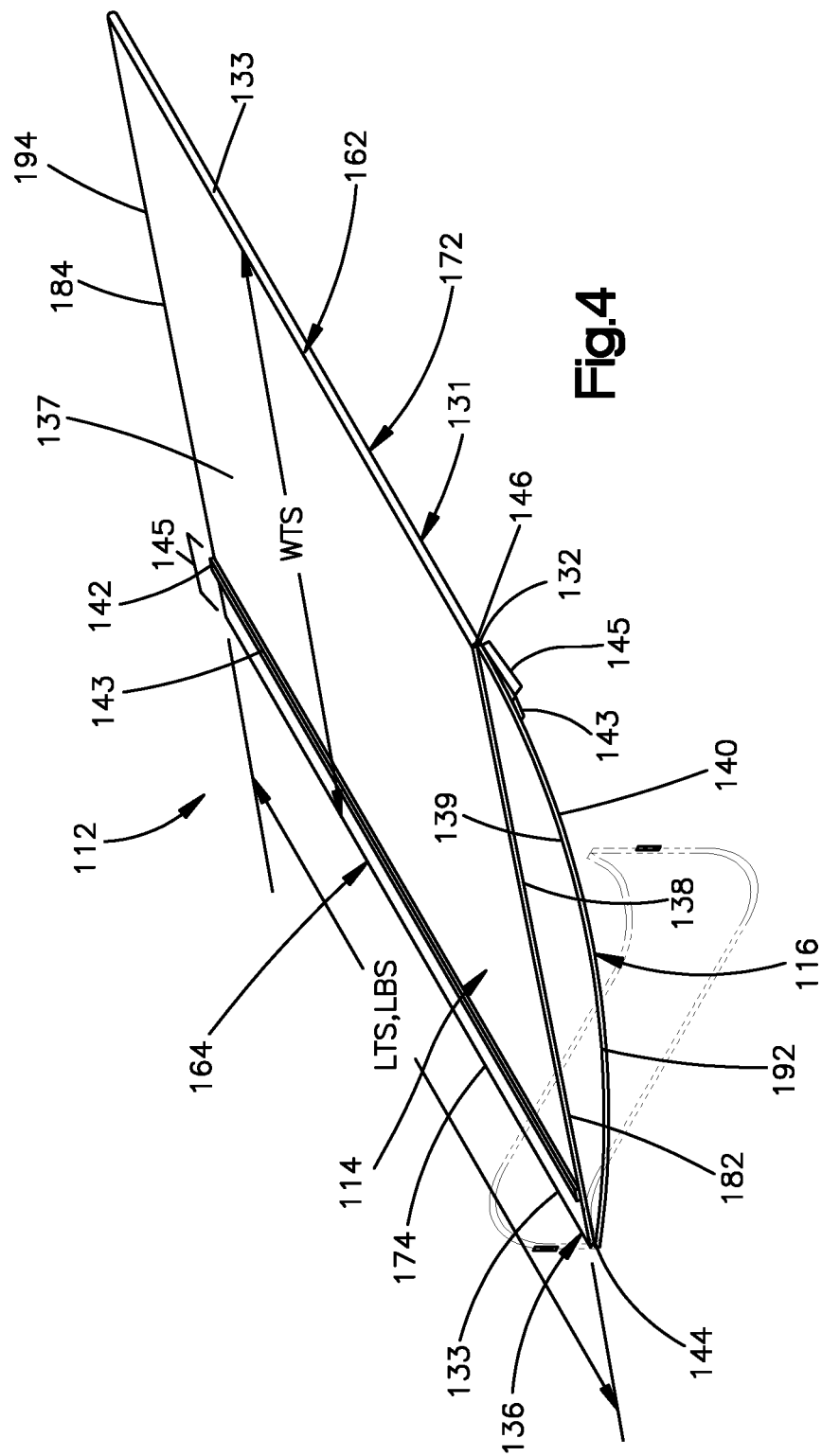
FIG. 4 shows a perspective view of one embodiment of the construction of a multi-layered vane element, prior to coupling to front and rear supporting members.

More specifically, referring to FIG. 4, top strip or layer 114 of material includes a top, outside, or exterior surface 137; a bottom, inside, or interior surface 138; and a right side edge 162 and a left side edge 164 defining a width "WTS". Top strip 114 has a first end 182 and a second end 184 defining a length "LTS". Bottom strip or layer 116 of material includes a top, inside, or interior surface 139; a bottom, outside, or exterior surface 140; and a right side edge 172 and a left side edge 174 defining a width "WBS". Bottom strip 116 has a first end 192 and a second end 194 defining a length "LBS". In the embodiment shown in FIG. 4, the width WTS of top strip/layer 114 is smaller than the width WBS of bottom strip/layer 116. Vane 112 may have top and bottom strips/layers 114, 116 that have equal widths or unequal widths, and in an alternative embodiment, width WTS of top strip/layer 114 may be larger than width WBS of the bottom strip/layer 116. In the embodiment of FIG. 4, the length LTS of top strip/layer 114 is equal to or substantially the same as length LBS of bottom strip/layer 116, but in alternative embodiments the lengths of top and bottom strips/layers 114, 116 may be different. In other embodiments, as explained below, more than two strips or layers may be used to form multi-layered vanes 112 having more than two layers.

Multi-layered vanes 112 in one embodiment, as illustrated in FIG. 4, may be independently created by overlaying a separate top sheet, layer, or strip 114 and a separate bottom sheet, layer, or strip 116, and coupling the sheets, layers or strips 114, 116 preferably directly to each other to form multi-layered vanes 112. Strips 114, 116 may be coupled along their first side outer edges 162, 172 to form an apex 146 and along their second side outer edges 164, 174 to form an apex 144. The strips 114, 116 may be coupled along very small longitudinally extending areas 132, 136, and may remain unconnected at the ends and in the middle portion of the strips. The very small longitudinally extending attachment areas 132, 136 may provide favorable flexibility characteristics to the joined side edges and apexes which may result in an aesthetic looking three-dimensional cellular vane 135 as described in more detail below. Small attachment areas 132, 136 of the two layers may form a weakened area, flexibility zone, or hinge 133 so the layers can readily separate from each other. Favorable flexibility may result from the weakened area and/or hinge being formed.

Preferably, inside surfaces 138, 139 of top and bottom strips 114, 116 are coupled to create very small attachment areas or regions 132, 136. Preferably, coupled regions 132, 136 are small, and hinge 133 forms at or approximate the same location as the coupled regions 132, 136. As shown in FIG. 6B, the side view of coupled region 132 where side edges 162, 172 are joined forms apex 146. Small coupled region 136 on the other side of vane 112 where side edges 164, 174 are joined forms apex 144 as shown in FIG. 4. Given that coupled regions 132 and 136 are small, the respective apexes 146, 144 are located substantially coincident with or at coupled regions 132, 136. Coupled regions or zones 132, 136 provide only a very small area where the layers are generally parallel to each other, and preferably each region 132, 136 forms a hinge 133, which facilitates movement of two strips/layers 114, 116 relative to each other (e.g., separation of the layers/strips) and opening of cavity 122, and affects the shape of cellular vane 135. Coupled regions 132, 136 preferably, but not necessarily, extend continuously the entire length of strips 114, 116 as shown in FIG. 4.

Coupled regions 132, 136 preferably each have a width "WAR" generally in the direction of the width WTS of the top strip 114 and the width WBS of the bottom strip that is preferably less than the thickness "TTS," "TBS" of the strips that form the vane. The widths "WAR" of the coupled regions 132, 136 in part will depend upon the thickness of the layers or strips forming multi-layered vane 112, and in some embodiments the width "WAR" of coupled regions 132, 136 is generally less than 2 mm, preferably less than 1 mm. In embodiments of the panel 104, the widths "WAR" of the coupled regions may be as low as about 0.05 mm and as large as about 2 mm or larger, and may vary therebetween in increments of about 0.1 mm. Non-limiting examples of the width of coupled regions 132, 136 include about 1.0 mm, about 0.8 mm, about 0.6 mm, about 0.5 mm, about 0.4 mm, about 0.3 mm, about 0.2 mm, about 0.1 mm, about 0.08 mm, and about 0.06 mm. In exemplary embodiments, the width of the coupled regions may be as large as about 0.5 mm and as low as about 0.125 mm. In other exemplary embodiments, the width of the coupled regions may be as small as 0.1 mm and as large as 1.0 mm, and may vary therebetween in increments of about 0.1 mm. The width of the coupled regions may vary depending upon the thickness and stiffness of the vane layers, as well as the desired of flexibility requirements for the multi-layered vane. The small width of coupled regions 133, 136 provides flexibility at the tip or apex 146, 144 and preferably provides hinges 133 or flexibility zones at the side edges or apexes which facilitates the relative movement and easy separation of the strips or layers 114, 116 and formation of a cell 122.

Forming small coupled regions 132, 136 can be achieved using a number of techniques. Some preferred techniques of forming the small coupled regions, and hinges 133 include fusing the materials together at the coupled region and may include welding, for example, ultra-sonic cut-welding or hot-knife welding/cutting. Using ultrasonic processes, two or more layers of materials 114, 116 are assembled and processed by overlaying the materials, where their edges may (or may not) be roughly aligned, and passing the layers between a vibrating horn 190 and a rotary drum (often referred to as an anvil) 191 as shown in FIG. 6A. The high frequency mechanical motion of the vibrating horn 190 and the compressive force between horn 190 and rotary drum 191 create frictional heat at the narrow region where horn 190 contacts vane materials 114, 116. The heat melts and cuts the materials into strips 114, 116 as well as welds and fuses respective first edges 162, 172 and respective second edges 164, 174 of layered materials or strips 114, 116 together to form respective apexes 146, 144. Excess trim 193 from the ultrasonic weld is removed from strips or sheets 114, 116 forming vane 112 and may be scrapped.

The heat generated by the ultrasonic action between vibrating horn 190 and rotating drum 191 occurs in a narrow region to form very narrow coupled regions 132, 136 along the edges 162, 164 of top strips 114, and edges 172, 174 of bottom strips 116. In an exemplary embodiment, horn 190 is 20 K ultrasonic and anvil 191 has a shallow angle 195 of as low as about 140 degrees and as large as about 170 degrees (and may vary therebetween in increments of about five (5) degrees), and more preferably about 150 degrees to about 160 degrees, which melts, welds, and seals the edges of the materials as it cuts. These parameters can be adjusted depending on factors such as the material and thickness of the strips, the design of vanes, and the intended use of the panel. Action of the ultrasonic cut-seal creates a very small bond area, e.g., a point weld, where the materials of top and bottom strips 114, 116 melt and fuse together.

In addition, in the ultrasonic cut weld process, areas 165 and 166 adjacent to coupled region 132 as shown in FIG. 6B may thin out or be thinner than and more flexible than the remaining body or width of vane layers 114, 116. While not shown, the areas adjacent to coupled region 136 may also be thinned out (thinner) and more flexible than the remaining body or width of strips 114, 116. Weakened areas 133 in combination with thinned regions 165, 166 formed by the ultrasonic weld process may form an even more flexible hinge 133.

A hot-knife will also melt, cut, weld, and fuse multi-layered strips 114, 116 together along their side edges 162, 172 and 164, 174 and will create a weld and coupled regions 132, 136 similar to an ultrasonic cut/seal. In the hot-knife process a hot-knife melts, cuts, welds, fuses, and seals edges 162, 172, and 164, 174 of respective top and bottom strips 114, 116 to form multi-layered vane 112 as the hot-knife passes through the multi-layered materials.

Both the ultrasonic cut-seal and hot-knife processes create a coupled region between the layers/strips where the multi-layered materials may be parallel for a small distance of about twenty thousandths of an inch and, as a result of the melting and flowing of the materials over a short distance, the vane materials may separate at a point or small region at and/or immediately adjacent the tip or apex 144, 146, and the vane materials are flexible and form a hinge at the apex.

In another embodiment, shown in FIG. 7, multi-layered vanes 112 may be formed utilizing a single sheet or strip of material manipulated, configured, perforated and/or folded over, and optionally creased, perforated, compressed, and/or heat-set along one side edge to form two layers (top layer 114 and bottom layer 116), a fold line 131, and apex 146. The optional creasing, perforating, compressing, and/or heat-setting may form a preferential fold line 131. The remaining side edges 164, 174 of top and bottom layers 114, 116 are coupled along small attachment area 136 to form apex 144. The fold line 131 and coupled region 136 provide favorable flexibility characteristics which may result in an aesthetic looking three dimensional cellular vane 135 as described in more detail below. The fold line 131, whether formed by folding, perforating, and optionally with creasing, perforating, and/or heat set processes, may form a hinge 133 so that the layers can easily separate from each other. In the embodiment where the multi-layered vane is formed using a fold line 131, the apex 146 is located at or substantially coincident with the fold line 131. The coupled region 136 may also form a weakened area, flexibility zone or hinge 133 so that the layers can easily separate from each other. The coupled region may be formed utilizing the ultrasonic or hot-knife process described above.

In another embodiment of panel 104, coupled region 132' may be formed by using glue or adhesive 127 to bond top and bottom strips 114, 116 along edges 162, 172 (shown in FIGS. 8, 11) and edges 164, 174 (shown in FIG. 11) to provide a three-layer structure at the coupled region or joint that includes top and bottom layers/strips 114, 116 and adhesive layer 127. And so the coupled region 132' tends to be thicker, and wider than coupled region 132 created by the ultrasonic or the hot-knife welding process, or the folding processes that form fold line 131. To achieve a proper bond with appropriate strength with the textiles appropriate for the multi-layered vanes, the width "WAR" of adhesive 127 or the glue line between strips 114, 116 is generally not less than 1 mm and is more likely about 1.5 mm to about 2 mm or larger depending upon the adhesive and the textiles used for the vanes. In addition, while glue line or adhesive 127 is shown extending all the way to the outer tip of edges 162, 172 in FIG. 8, the glue may not extend all the way to the tip or outer edge which tends to extend the width WAR of coupled region 133' and the region where top strip 114 and bottom strip 116 are held in a parallel relationship.

The multi-layer structured attachment using adhesive bonding of the top and bottom layers of the multi-layered vane tends to be more rigid and tends to restrict movement of strips 114, 116 more than coupling the vane materials using a welding or fusing processes, or using a folding process. Adhesive bonding of the vanes tends to hold the two layers of the multi-layered vane in a parallel relationship longer than either a fold line or fusing (e.g., welding) coupling or attachment process, so that the coupled region tends to be wider and the two layers resist separating more than when a fusing process is utilized. The more rigid, less flexible, longer (wider) coupled region also affects the shape the vanes form during operation of the panel. As shown in FIG. 11, the use of an adhesive 127 to couple top and bottom strips 114, 116 together will create a cellular vane 135' that has a cavity 122', but the coupled regions have a larger width WAR and cavity 122' tends to have a smaller volume and a different shape than the cavity created with smaller coupled regions 132, 136 created by fusing the materials together or coupling the materials in a small coupled region that is generally less than about 1.5 mm and smaller (e.g., about 0.05 mm to about 1.0 mm).

As shown in FIG. 11, in another embodiment, multi-layered vane 135" may be formed by a fold line 131 forming apex 146 and small coupled region 136 created by welding forming apex 144. Attachment or coupling of top and bottom strips 114, 116 in cellular vane 135" may be formed using ultrasonic or hot-knife cut-welding. The cell/cavity 122" formed using a fold (and crease, perforation, and/or heat set) may form hinge 133" and tends to create cavity 122" that is larger and has a different shape than the cavity created with coupled regions created only by welding or adhesive bonding. In other embodiments, the respective side edges of the top and the bottom strips creating first side edge of the multi-layered vane may be coupled using an adhesive process, while the other respective (second) side edges of the top and bottom strips of the multi-layered vane may be coupled using a welding process.

More layers may be created by manipulating, configuring, creasing, folding, and/or heat setting the vane material differently (in three or four sections or more) and coupling along edges or folded regions to form a tubular structure that may be opened or compressed. Multi-layered vanes may also be created and have the structure illustrated in U.S. Application No. 62/414,548, filed on Oct. 28, 2016 (the same date as this application), and entitled "Covering for Architectural Features, and Related Methods of Operation, Manufacture and Systems", the disclosure of which is incorporated herein by reference in its entirety.

The individual widths "WTS" and "WBS" of top strip 114 and bottom strip 116 between coupled regions 132, 136, the respective widths of top strip 114 and bottom strip 116, and the nature and type of coupled regions 132, 136, or use of a fold line 131, as well as other factors, will affect the shape of the vanes, and the formation and shape of the cell cavity formed during operation of the panel 104 and movement of the sheets 118, 120. Specifically, the width WTS of top strip 114 preferably is less than or the same as, the width WBS of its respective bottom strip 116. FIG. 4 illustrates a multi-layered vane that has a top strip 114 that has a width WTS between coupled regions 132, 136 that is less than the width WBS of the bottom strip 116 between coupled regions 132, 136. In some embodiments, the top and bottom strips may be different in width by, for example, about 0.030 inches for an about four (4) inch width of material, or about 1% different. In some embodiments the difference in width between top strip 114 and the bottom strip 116 may be as low as about 0.5% and as high as about 3%, and may vary therebetween in increments of about 0.25%, although other amounts are contemplated. For vanes of about three (3) inches to about four (4) inches, the difference in width between the top and bottom strips 114, 116 may be as low as about 0.5 mm and as high as about 4.0 mm, and may vary therebetween in increments of about 0.1 mm, although other differences in respective widths between the top and bottom layer are contemplated, depending upon the materials utilized and the desired characteristics for the multi-layered vane. Bottom strip 116 being wider than top strip 114 may facilitate the opening of and the shape of cell 122, and may permit a larger volume cell 122 when multi-layered cellular vane 135 is in the open, expanded position.

Additionally, the difference in the width of the top and bottom strips may also assist in rolling up the fabric evenly around roller without creating extra tucks of material that may result in wrinkles. Multi-layered vanes where the layers or strips 114, 116 have equal widths between their coupled or folded edges 162, 172 and 164, 174 may result in potential creasing and wrinkling of the vane material when being rolled around a roller because in order to lay flat against each other when positioned around the roller, the outer strip has to be wider than the inner strip. The outer layer or strip of multi-layered vane 112, in order to trace the same circumferential arc as the inner layer or strip of multi-layered vane 112 and lay flat against the roller, generally should be wider than the inner layer or strip, otherwise there may be stretching of the outer layer and/or tucks of extra fabric on the inner layer that may create wrinkles and potential imperfections in vanes 112. Such effects may be minimized by providing a larger width for strip 114, 116 that rolls around roller 126 as the outer layer of multi-layered vane 112, i.e., the outer strip. Typically, bottom strip or layer 116 will roll around the outside of the roller and is larger than top strip 114 to minimize wrinkles and imperfections. The range of the difference in width for the outer layer or strip of multi-layer vane 112 as compared to the inner layer or strip can be calculated based on the thickness of the material used for the strips, the diameter of the roller, and the width of the vane.

Strips or sheets 114, 116 forming multi-layered vanes 112 may be created from wide rolls of fabric that are pre-slit into strips of about 2.5 inches to about 4.5 inches, and may vary therebetween in increments of about one quarter (¼) of an inch. Nonwoven fabrics may be used for the multi-layered vane layers, which may be thinner and cheaper than woven fabrics. For example, non-woven fabrics, preferably polyester fabrics having a thickness of about 0.005 inches may be utilized for the vane layers. Woven fabrics may also be used, and the ultrasonic or hot-knife welding (cut-seal) process will seal the edges of the fabrics to prevent fraying. The fabrics for the vanes can be made from various and numerous materials depending upon the characteristics desired, and may include, for example, polyester, which provides suitable welding in ultrasonic and hot-knife applications.

Suitable materials and design patterns may be selected for the top and bottom strips to enhance the shading or privacy effect of the multi-layered vanes and create a desirable appearance. The materials for top and bottom strips 114, 116 may be the same or different. In addition, the materials can have a desirable range of color and/or opacity. Bottom surfaces 138, 140 of one or both of top and bottom strips 114, 116 can be printed in color or with a design. Or top surfaces 137, 139 of one or both of the top and bottom strips can be printed in color or with a design. In addition, one or both of the top and bottom strips may be printed on both surfaces (double printed). If the strips are to be printed, they are preferably printed prior to the formation of the coupled regions along their edges.

In one embodiment the covering may be designed to substantially block light from being transmitted through the opening in a closed configuration, e.g., a room darkening version, by utilizing multi-layered vane 112. For example, the strip 114, 116 that faces the exterior 101 or rear may be black or darker in color than the other strip. Rear facing strip 114, for example, may be a material that substantially blocks any light from passing through the material and the other strip can be made from a translucent material. By utilizing a multi-layered vane having a black or dark strip (e.g. a layer or strip that substantially blocks any light from passing through) facing the rear and a translucent strip facing the front, any defects in the rear room-darkening strip, or any light transmitted past the rear layer will be diffused by the front facing layer. In the privacy orientation, the darker (e.g., black) strip facing the rear is bottom strip 116. In the shading orientation, the darker (e.g., black) strip facing the rear is the top strip of the multilayered vane. Alternatively, a material that is very light diffusive can be used for the rear strip, preferably bottom strip 116, and a textured fabric may be preferred for the front facing strip, preferably top strip 114, or vice versa.

The vanes may also contain one or more additional layers besides top and bottom strips 114, 116. For example, as shown in FIG. 10, use of third strip 129 positioned between top strip 114 and bottom strip 116 may form a middle layer in multi-layered vane 112'. The third or middle layer, and optionally additional layers, may be a film. Films or fabrics made from polyester may have enhanced bonding and/or welding with other polyester materials that may be utilized for the other strips forming the multi-layered vane. The additional layers in a multi-layered vane may provide better shading effect. In an illustrative embodiment, shown in FIG. 10, a first roll of fabric 167 of top strip 114, a second roll of fabric 168 of middle layer material 129, and a third roll 169 of bottom strip 116 are each unrolled so that the top strip 114, middle layer material 129 and bottom strip 116 are arranged as layers and fed to an ultrasonic welder or other coupling or attachment process to form multilayer vane 112'. In particular versions, use of a third layer in multi-layered vane 112' may provide an improved room-darkening vane. In one embodiment, the third layer 129 may form a middle layer and materials may be selected to provide room-darkening so that light is inhibited from passing through the multi-layered vane. Metalized films such as DuPont #329 and Mylar may be used as the third middle layer 129 to provide a room-darkening effect. All three layers preferably may be welded (cut-sealed) at the same time, and coupled at their edges. In one embodiment, the third layer is only coupled to the other layers at its edges and it is free to separate between its edges from the other layers to form a cell, cavity, or spacing.

Static electricity buildup may affect separation of the vane layers and opening of the vane. This is especially an issue with thin sleek cells. Therefore, treatment of the vane materials with antistatic compounds, particularly on inner surfaces 138, 139 of layers/strips 114, 116 may reduce this static effect and facilitate the opening of the layers/strips to form cells 122. An antistatic material may also be incorporated into layers/strips 114, 116 by, for example, printing the antistatic material on a surface of the vane layers/strips.

Construction of the Panel

In panel 104, vanes 112 extend from vertical support members 118, 120 and one embodiment may be coupled to vertical support members or support members 118, 120 at connection locations 142 and 148 as shown in FIGS. 5, 9, 11 and 12. In one embodiment, the multi-layered vanes are adhesively bonded to support members 118, 120 which are sheer fabrics. The manner in which the vanes are coupled to the support members typically affects the shape of and opening of cells 122 of multi-layered vanes 112. In one embodiment, bottom strip 116 is coupled to front support member 118 using adhesive at a first connection location 148 and top strip 114 is coupled to rear support member 120 using adhesive at a second connection location 142 (FIGS. 5, 9, 11, and 12). Each of first connection location 148 and second connection location 142 extends in the width direction of front and rear support members 118, 120 and preferably extends substantially continuously along the length of the vanes (i.e., the width of the panel and/or sheet). In one embodiment, glue or adhesive 143, preferably a polymer adhesive, is applied to vanes 112, and vanes 112 are thereafter applied to support members 118, 120. More specifically, adhesive 143 preferably is applied in a line along the length of vane 112, preferably, but not necessarily, continuously without interruption along the entire length of vanes 112. The widths of connection locations 148, 142 (in same direction as width of strips 114, 116) may be as low as approximately 1 mm and as high as approximately 10 mm or more. In one embodiment, the width of the connection locations may be about 2 mm to about 3 mm. In one embodiment, the width of connection locations 148, 142 may be larger, at least four times larger, and more likely ten times larger than the widths of coupled regions 132, 136. In one embodiment, connection locations are glue lines which may be applied to the vanes and/or the vertical support members.

In a multi-layered vane 112 as shown in FIG. 4, one or more glue lines 142 may be applied to a top layer/strip 114 and one or more glue lines 148 may be applied to a bottom layer/strip 116. First glue line 148 may be applied to bottom or outer face 140 of bottom strip 116 and second glue line 142 may be applied to top or outer face 137 of top strip 114. In a panel 104 that rolls up from the front 119 of the roller and is configured so vanes 112 are in a shading orientation, as illustrated in FIGS. 2A-2C and 5, bottom strip 116 with first glue line 148 is coupled to front sheet 118 while the top strip 114 with second glue line 142 is coupled to rear sheet 120.

Figure 12:
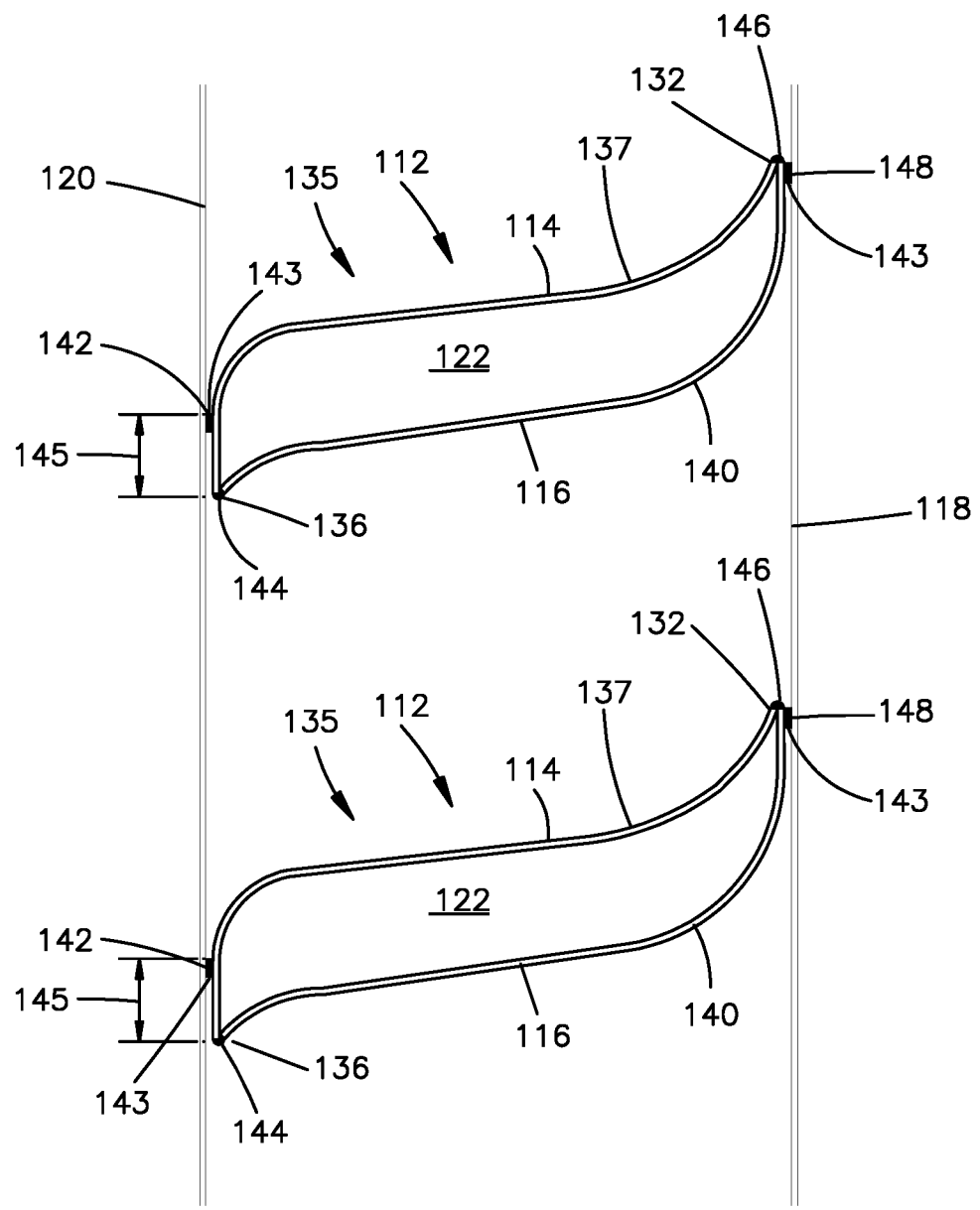
FIG. 12 is a side elevation partial view of another embodiment of a covering showing a cellular vane where the cellular vane is coupled to one vertical support member with an offset and coupled to the other vertical support with no offset.

Connection locations 148, 142 in one embodiment are both spaced from or offset a distance 145 from their respective proximate coupled regions 132, 136 and/or apexes 146, 144 (FIG. 5), or only one of connection locations 148, 142 may be offset or spaced a distance from its respective proximate coupled region 132, 136 and or apex 146, 144, while the other connection location 148, 142 overlaps with its respective proximate coupled region 132, 136 and/or apex 144, 146 (see FIG. 12). For example, in FIG. 5 coupled region 132, apex 146, and connection location 148 are proximate (e.g., within 1 cm of) front sheet 118 and coupled region 132 and/or apex 146 are closer to connection location 148 (e.g., glue line 148) then connection location 142, and for nomenclature purposes connection location 148 is considered proximate, corresponding, and respective to coupled region 132 and/or apex 146 and vice versa. Similarly, in FIG. 5 coupled region 136, apex 144 and connection location 142 (e.g., glue line 142) are proximate (e.g., within 1 cm of) rear sheet 120 and coupled region 136 and/or apex 144 are closer to connection location 142 then connection location 148 and for nomenclature purposes connection location 142 is considered proximate, corresponding and respective to coupled region 136 and/or apex 144, and vice versa.

Offset distance 145 between coupled regions 132, 136 or apexes 144, 146 and the respective, proximate connection locations 148, 142 may affect the openness of cell 122 in multi-layered cellular vane 135. Offset distance 145 facilitates the separation of top strip 114 and bottom strip 116 and the formation of a three-dimensional cellular shape. A bigger offset distance 145 generally provides a fatter cell or cavity 122, while a smaller offset distance 145 leads to a thinner cell or cavity 122. In general, offset distance 145, generally from an apex point 146, 144 (coupled region 132, 136) to a respective, proximate connection location 148, 142, may range from zero, where there is no offset, to as high as about 15% of the width of the respective top or bottom strip 114, 116. Non-limiting examples of offset distance 145 are from as low as about 1% to as high as about 15% of the width of the top or bottom strip 114, 116, which may be implemented, for example, in increments of about 1%. In an exemplary embodiment, for a panel 104 with vanes ranging from as low as about 5 cm to as large as about 12 cm in width, offset distance 145 may be as little as about zero (no offset), and may be as large as about 1 cm or larger between connection locations (glue lines) 148, 142 and their respective proximate apex points 146, 144 or coupled regions 132, 136, and may vary therebetween in increments of about half a millimeter. In one embodiment where an offset is desired, offset distance 145 may range from about 5 mm to about 8 mm, more preferably about 6 mm to about 7 mm. Generally, where the connection locations are offset from their respective, proximate apex and/or coupled region, the connection location may be within 1 cm or less of its respective apex and/or coupled region for a vane having a width ranging from about 5 cm to about 12 cm.

In some embodiments, only one of the two connection locations (e.g., glue lines) 148, 142 may be placed an offset distance 145 from proximate, respective apexes 146, 144 of coupled regions 132, 136. As shown in FIG. 12, coupled region 132 (and apex 146) may substantially overlap and/or be immediately adjacent with connection location (e.g., glue line) 148. This overlap of the coupled region with the connection location can be advantageous on front sheet 118 of panel 104, because a joint (e.g., a glue line) between the vanes and vertical support members at the apex or edge of the multi-layered vane may look better than a joint (e.g., glue line) a distance away from the apex. When one of connection locations 148, 142 overlaps with one of coupled regions 132, 136, and one of coupled regions 132, 136 is offset from one of connection locations 148, 142, the multi-layered vane still tends to open and create cavity 122 and forms nearly the same shape as a multi-layered vane coupled with offsets 145 along or proximate both of the front and back sheets. Multi-layered vane 112 still forms a cell or cavity 122 because the distance between first connection location 148 to apex 144 of bottom strip 116 adjacent back sheet 120 is nearly the same distance as the distance between second connection location 142 and apex 146 of top strip 114 adjacent front sheet 118, and to equalize forces, bottom strip 116 tends to follows a curve similar to top strip 114.

When front support member 118 is laterally spaced from rear support member 120, the resulting cellular vanes 135 preferably have a floating appearance, and for example, an S-shape or a rectangular shape. The shape of the multi-layered vane may depend on various factors including, for example, the individual width of top strip 114 and its respective bottom strip 116, the respective widths of top and bottom strips 114, 116, the distance 145 between coupled regions 132, 136 and its respective, proximate first or second connection locations 148, 142, the distance separating front sheet 118 and rear sheet 120, the stiffness of the material for top and bottom strips 114, 116, and the flexibility and the width of coupled regions 132, 136, or the type and location of fold line 131.

In one embodiment, for a panel 104 with an about 5 cm to about 12 cm multi-layered vane width, first and second coupled regions 132, 136 have a width of about 1 mm or less, preferable about 0.5 mm to about 0.125 mm; first and second connection locations 148, 142 have a width of about 2 mm to about 8 mm; and second glue line 142 on top strip 114 is offset a distance 145 of about 5 mm to about 8 mm from second coupled region 136 or apex 144 to form a hinge 133 at or about apex 144. First glue line location 148 on bottom strip 116 may have an offset distance of about 5 mm to about 8 mm, or more preferably overlaps with and has substantially no offset distance from first coupled region 132 or apex 146 to form a hinge 133 at or about apex 146. In another embodiment, as illustrated in FIG. 11 where the multi-layered vane 135" has a width of about 5 cm to about 12 cm and is formed having a preferential fold line 131 forming an apex 146 and a small coupled region 136, the coupled region 136 may be formed by welding and has a width of about 1 mm or less, preferable about 0.5 mm to about 0.125 mm; first and second connection locations 148, 142 have a width of about 2 mm to about 8 mm; and the second connection location 142 is offset a distance 145 of about 5 mm to about 8 mm from apex 144 to form hinge 133. The first connection location 148 may have an offset distance 145 of about 5 mm to about 8 mm, or may overlap with and has substantially no offset distance from fold line 131 or apex 146 to form a hinge 133' at or about apex 146.

Figure 5:
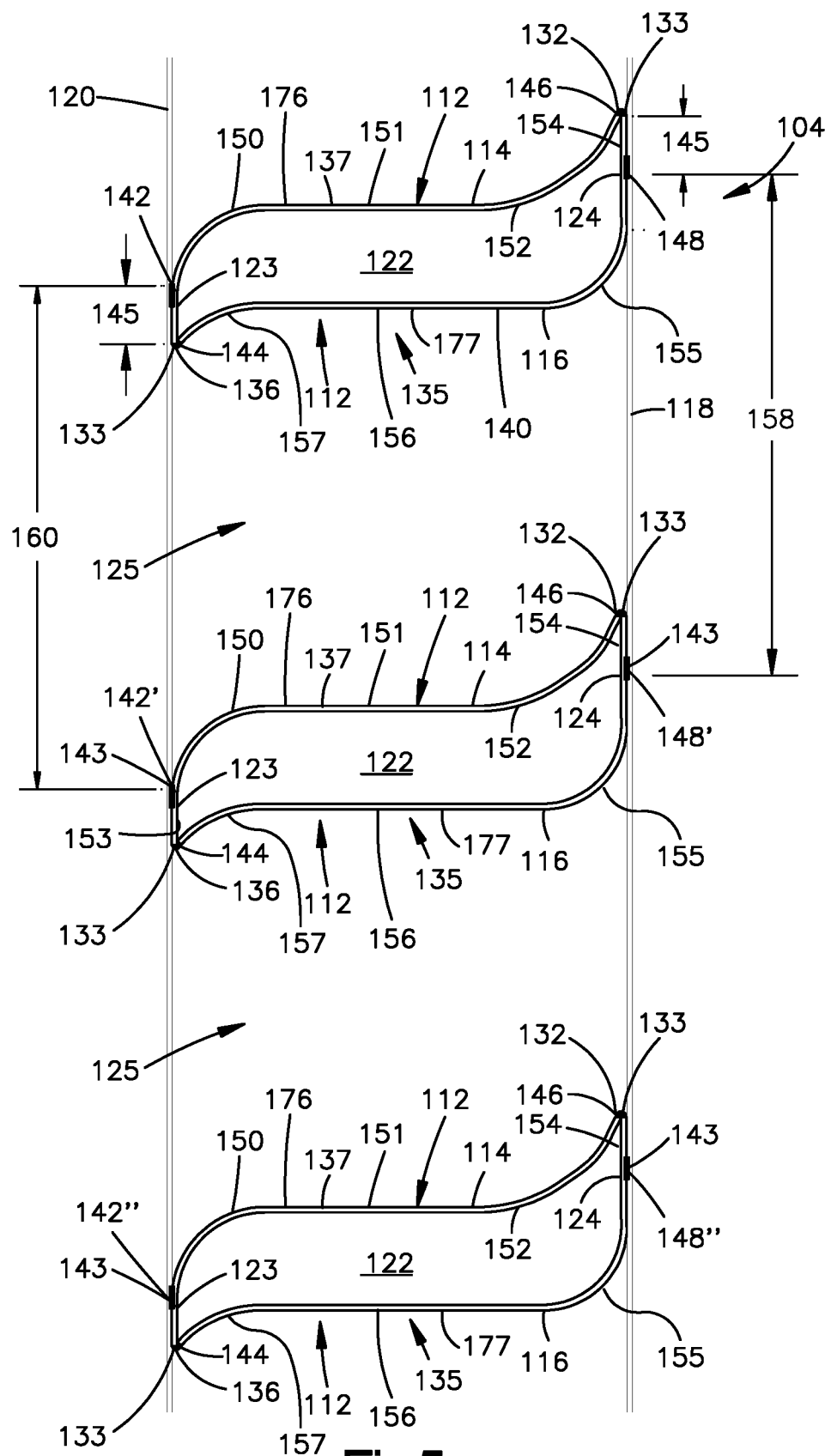
FIG. 5 is a side elevation partial view of an embodiment of a covering showing multi-layered vane elements coupled to front and rear support members forming cellular vanes.

As described above, multi-layered vanes 112 in covering 100 are separately created to form a collapsible and expandable tube. The multilayered vanes are separately coupled (attachment locations 148, 148', 142, 142') to the supporting sheets with space or gaps 125 provided between the vanes as shown in FIG. 5. Each multi-layered vane 112 may form a longitudinal tube or sleeve having continuous walls that circumscribe and form a cell or cavity 122 having a cross-sectional shape with open ends. The cross-sectional shape may be rectangular, polygonal, double-S shaped or may have other cross-sectional shapes.

With reference to FIG. 5, which is a view of the multi-layered vanes 112 in an open position, top strip 114 spans generally between front support member 118 and back support member 120, and bottom strip 116 spans generally between back support member 120 and front support member 118. More particularly, in the open position, in one embodiment the multi-layered vane entirely circumscribes a space or cell having sidewalls 123, 124, top wall 176, and bottom wall 177. Side wall 124 generally extends substantially vertically along and proximate to front support member 118 between glue line location 148 and apex 146, while side wall 123 generally extends substantially vertically along and proximate to rear support member 120 between glue line location 142 and apex 144. Top wall 176 runs generally horizontal between glue line 142 and apex 146, while bottom wall 177 runs generally horizontal between glue line 148 and apex 144.

In one embodiment with the multi-layered vanes in the open position, each of top strip 114 and bottom strip 116 form a substantially sideward "S" shape. Tracing the shape of top strip 114 in FIG. 5, second coupled region 136 is located adjacent to rear support member 120 and section 153 or side wall 123 extends from apex 144 of second coupled region 136 at hinge 133 upward generally parallel to vertically extending rear support member 120 to second glue line location 142 where top strip 114 is coupled to inside surface 121 of rear support member 120. A portion of top strip 114 forms side wall 123, and at glue line 142 extends along (e.g., is substantially parallel to) rear support member 120 and in section 150 extends substantially vertically upward from glue line 142 and thereafter bends and curves towards front support member 118, and the curvature of top strip 114 continues as it extends away from rear support member 120 towards front support member 118. In this manner, section 150 of top strip 114 takes on the shape of the bottom portion of the letter "S". Top strip 114 then changes direction at an inflection region 151 located between the front and back support members 118, 120 and bends in section 152 upward towards coupled region 132 and apex 146 which is located adjacent front support member 118. In this manner, section 152 of the top strip 114 takes on the shape of the top portion of the letter "S".

Bottom strip 116 also forms a generally "S" shape curvature and is similar in shape to top strip 114. More specifically, tracing the shape of bottom strip 116, first coupled region 132 is located adjacent front support member 118 and section 154 of bottom strip 116, or side wall 124, extends from apex 146 of first coupled region 132 at hinge 133 downward generally parallel to vertically extending front support member 118 to first glue line location 148 where bottom strip 116 is coupled to the inside surface of support member 118. A portion of bottom strip 116 forms side wall 124, and at first glue line location 148 extends along (e.g., is substantially parallel) front support member 118 and extends substantially vertically downward from first glue line location 148 and thereafter bends and curves in section 155 from first support member 118 towards back support member 120, the curvature of bottom strip 116 continuing as it extends toward back support member 120. As bottom strip 116 extends away from first glue line location 148 section 155 of bottom strip 116 resembles the bottom half of an "S" shape as it starts to head upward. Bottom strip 116 then bends and changes direction at inflection region 156 located between the front and back support members 118, 120 and bends downward in section 157 as it extends towards rear support member 120 where bottom strip 116 terminates at apex 144 of second coupled region 136 adjacent to rear support member 120. In this manner, section 157 of bottom strip 116 takes shape of the top portion of the letter "S".

Small coupled regions 132, 136 of strips 114, 116 and/or the relatively thin flexible nature of the material forming strips 114, 116 contributes to and facilitates the formation of hinges 133 at or adjacent apexes 146, 144, which in combination with coupling at least one vane layer and possibly both vane layers to the support members at an offset distance from coupled regions 132, 136 (and apexes 146, 144), facilitates the separation of the layers, the formation of cavity 122, and the shape (and in some embodiments the substantially "S" shape) of the multi-layered vanes.

Construction of the Support Members May Include Sheers

The material and design for the front and rear support members 114, 116 are independent aspects of the design of panel 104. In one embodiment, the front and rear support members may be formed partially or wholly as sheers, and more preferably sheer fabrics. A sheer is a material that has openings that permit light and view-through. The openness of a material, e.g., a sheet, may be measured by its openness factor which measures the percent of open space in, for instance, a material, where a 60% openness factor ("OF")

has 40% material and 60% holes or open spaces. The higher the openness factor OF, the more sheer and better view through provided by the material. One manner of measuring openness factor is to measure the area of the yarns and/or open areas and calculate the percentage of area that has no material. In one example a digital microscope or high resolution camera may be used to capture an image of the material and the image used to calculate the percentage that does not have fabric, yarns, or material. A Motic digital microscope and Motic Image Plus 2.0 Software may be used to measure the openness factor of various materials. While a portion of the discussion of the vertical support members refers to sheers and the openness factor of sheers, it should be appreciated that the vertical support members can be fabrics, films, and other materials that are formed with or which are later processed to receive openings and holes in order to provide view through characteristics and an openness factor OF. By selecting suitable materials for the support members, including the appropriate openness factor for the sheet material, in combination with the volumetric look of the cellular vane, the function and aesthetic appeal of the panel and covering may be varied.

In one embodiment, the rear and/or front support members may be black or a dark color, such as, for example, grey. In a particular embodiment, rear sheet 120 may be black or a dark color, and may be darker than front sheet 118. For example, the rear support member can be made from a pigment colored material, such as, for example, polyester. Coloring or providing rear support member 120 in a dark color or black may increase visibility through that support member and the panel. In addition, black or dark coloration for rear support member 120 may substantially reduce the glitter or glisten effect of the material, which may otherwise occur in bright light. The front support member may be black or a dark color, or may be lighter colored than the back support member, and may be clear, white, or light colored. In one embodiment, the front support member may be a sheer and the back support member may also be a sheer.

Pigment or dye may be used to color sheets 118, 120. Effective coloring can be achieved by adding pigment, for example, carbon black or other dark or black pigment, to a molten polymer when making the fiber, and thus dispersing and saturating the color throughout the yarn. This solution dying process generally works well for preparing single color yarn, which can be used to make long lasting exterior fabrics which are more resistant to ultraviolet (UV) degradation. The embedded pigment may act to block UV rays and consequent degradation. Alternatively, or in addition to, the thread or yarn may be dyed darker, using, for example, dispersion dyes after manufacturing the yarn. One manner of dying the fabric could be by printing with the dye, for example by using a roller. One or both sides of the fabric may be printed. A darker colored rear sheer should be generally less susceptible to UV degradation and may allow the use of thinner or finer yarns for the front sheer resulting in better view-through for the panel 104.

Support members with a higher openness factor as low as sixty percent (60%) to as high as about eight five percent (85%) in increments therebetween of about two percent (2%) are preferred for aesthetic reasons. In particular, support members with a high openness factor, preferably greater than sixty percent (60%), more preferably greater than sixty-five percent (65%), seventy percent (70%), more preferably greater than seventy-five percent (75%) and greater than eighty percent (80%) or higher may be preferred for aesthetic reasons. In embodiments, different finer (thinner) yarns may be used which may contribute to a higher openness factor. Use of dark yarns may be advantageous for the additional reason that sunlight may not degrade the materials in the covering, and the materials will retain their strength.

When constructing a panel 104 having two support members formed as sheers, partial sheers, or with numerous openings as the vertical supporting members, factors such as strength, durability, stretch, UV degradation, and moiré light interference are all factors in the design of an acceptable covering 100. Moiré may occur as a result of light interference when two sheer materials overlay each other and light is transmitted there through. Moiré which is a light interference artifact that may occur in a covering having front and back sheers as vertical support members, is preferably avoided or at least minimized and reduced when producing a covering, particularly coverings for windows and the like where light passes there through.

One manner of reducing moiré is to use different sheer fabrics for the front and rear sheets and/or selecting, processing and/or configuring sheer fabrics so that the yarns, and interstitial spacing and connection points do not align or nearly align. One manner of reducing moiré is to provide a front sheet (e.g. sheer) and a back sheet (e.g., sheer) that have different shaped openings and/or different orientations of openings. Moiré may further be reduced where the front and rear sheets (e.g. sheers) have different size openings between the yarns, and further where the size openings are not low multiples of each other. For example, using different fabrics having different shaped (for example, diamond versus rectangular) and different sized opening is useful to reduce moiré. In addition, avoiding or reducing the multiples (number of times) that the yarns align or nearly align may reduce moiré. Using a width and/or length dimension for the openings in the first sheet that are not a low multiple of (e.g., not less than 1.2 times larger than) the width and/or length dimension for the openings in the second sheet is believed to assist with reducing moiré. For example, it is preferable to use an opening in the second sheer whose width is about 1.3 or more times larger or smaller than the width of the opening in the first sheer. Similarly, the opening in the first sheer in the length direction is preferably about 1.3 or more times larger or smaller than the opening in the second sheer in the length direction. In one example, a first sheer is used in combination with a second sheer where the opening of the second sheer is about 1.5 times larger or smaller in the width direction and about 3.4 times larger or smaller in the length direction. The first sheer may be a rectangular opening of about 7.3 mm in width and about 4.1 mm in length while the second sheer may be a diamond opening of about 10.7 mm in width and about 14.1 mm in length. Other shapes and sizes for the openings in the first and second sheers are contemplated.

In one embodiment of panel 104, an orthogonal grid fabric may be used as front sheer 118. For example, a Leno or gauze weave fabric may be used for the front sheer 118. In a Leno fabric, warp yarns are used in pairs and twisted together in a way that traps the weft yarns in place so that the yarns do not slide, which would alter their spacing. The Leno sheer allows a wider spacing of yarns and a very open weave with fine yarn which provides good view-through. In one embodiment, the Leno weave for the front sheer has a cross-direction density of about 21 yarns per inch (ypi) (cross yarn is two yarns twisted together) and a machine direction density of about 25 ypi. In one embodiment, the Leno weave for the front sheer has a rectangularly shaped opening with dimensions of about 7.3 mm in width (distance between paired warp yarns) and about 4.1 mm in length (distance between weft yarns). Other cross and machine direction density values are contemplated and exemplary values would range from about 15 to about 30 cross direction ypi and about 15 to about 30 machine direction ypi depending upon the yarn denier. In another embodiment, the fabric for the front sheer is a Leno or plain weave, with 22 warp ypi and 22 pairs of weft ypi. Preferably, the front sheer has an openness factor of as low as about sixty percent (60%) and as high as about eighty five percent (85%), which may vary therebetween in increments of about two percent (2%). Preferably, the front sheer has on openness factor of greater than sixty percent (60%), more preferably greater than about sixty-five percent (65%), more preferably about seventy percent (70%) or higher including about seventy-five percent (75%), eighty percent (80%) and about eighty-five (85%). The Leno fabric may be made from monofilament or multifilament yarn with a denier that ranges from about 16 to about 24 and may be about 20. An example of a Leno fabric for use in the covering is an Englebert Steiger Leno fabric. The Englebert Steiger Leno fabric preferably has an openness factor greater than about sixty-five percent (65%). While, the Leno fabric with orthogonal grid has been discussed as being used as the front vertical support member, it will be appreciated that the Leno fabric may be used as the rear vertical support member and other materials may be used as the front vertical support member.

Further, a different fabric, for example, a diagonal grid fabric may be used for the rear sheer 120. The diagonal grid is preferably a knit Tulle fabric and may be made, for example, with either a 20/1 or a 20/12 yarn. The 20/12 is made with a 20 denier yarn with 12 filaments while the 20/1 is a 20 denier yarn with a single or monofilament. The 20/1 monofilament yarn has a slightly smaller overall diameter and thus, when formed into a sheer, has better view through and openness factor than the 20/12 and may be the preferred choice. The Tulle may be made on a 20-gauge warp knitting machine, so 20 warp yarns per inch are fed into the knitter, and no fill yarns are used on the warp knitter. In an exemplary embodiment, the Tulle for the rear sheer is about 20 gauge (yarns) in the cross (width) direction and about 10 courses in the machine (courses per inch). In an alternative embodiment, the Tulle may be knitted on a 32-gauge knitter with every other needle removed to create a 16-gauge Tulle diagonal fabric. The rear sheer preferably has an openness factor as low as about sixty percent (60%) and as high as about eighty five percent (85%), which may vary therebetween in increments of about two percent (2%). In one embodiment the rear sheer preferably has an openness factor greater than about sixty percent (60%), more preferably greater than sixty-five percent (65%), more preferably greater than seventy percent (70%) or higher including greater than seventy-five percent (75%), about eighty percent (80%) or higher, and about eighty-five percent (85%). That is, front and rear sheers with an openness factor that ranges from as low as about sixty percent (60%) to as high as about eighty-six percent (86%) have produced desirable results. In one embodiment, the Tulle sheer may have an openness factor OF greater than seventy-five percent (75%) and less than ninety percent (90%), and more preferably between about eighty percent (80%) and eighty-six percent (86%). While a diagonal grid fabric and particularly a knit Tulle fabric has been disclosed as being used for the rear vertical support member it may be appreciated that a diagonal grid fabric, for example a knit Tulle fabric, may be used for the front vertical support member and other materials may be used for the rear vertical support member.

Tulle sheer fabrics, made in very open grid constructions, for example with a 20-gauge warp knitter, a 32-gauge knitter with every other needle removed to create a 16-gauge Tulle fabric, or a 28-gauge knitter which is finished by stretching to a 20-gauge fabric, can provide good view-through while avoiding or reducing moiré or interference patterns with the Leno weave face sheer. In an embodiment, the Tulle fabric for the rear sheer is prepared on a 28-gauge knitter and is finished by stretching to about a 20-gauge fabric where the openings have dimensions of about 10.7 mm in width and about 14.1 mm in length. In one embodiment, a rear Tulle knit sheer fabric with diagonal grid pattern made from a dark (for example, grey or black) 20 denier yarn creating an about 20 to about 16-gauge fabric is used, in combination with a Steiger Leno front sheer having 15-30 ypi in the cross direction and 15-30 ypi in the machine (weft) direction. In one embodiment, a Steiger Leno front sheer having rectangularly shaped openings of about 7.3 mm in width and 4.1 mm in length are paired with a Tulle rear sheer prepared on a 28-gauge knitter that is finished by stretching to about a 20-gauge fabric where the openings are about 10.7 mm in width and about 14.1 mm in length. The Leno fabric and Tulle fabric may both be dark (for example, gray or black) and/or one of the fabrics may be lighter (for example, gray vs. black), or a light color (for example, beige or white). Optionally, the rear sheer fabric may be the Leno weave fabric and the front sheer may be the knit Tulle fabric. The sheer fabrics, in particular a Leno weave and a Tulle knit, may be used with non-cellular vanes, multi-layered cellular vanes, and combinations thereof.

In one embodiment a panel may be formed of a front vertical support member and a rear vertical support member each having an openness factor greater than sixty (60%) and the panel may further have non-cellular vanes, multilayered cellular vanes, or a mixture of both vane types. In one embodiment the rear sheet may be a black sheer with an openness factor of about seventy-five percent (75%) or greater, and further may be an about 16 to about 28-gauge Tulle knit fabric, for example a 28-gauge Tulle that is finished by stretching to a 20-gauge sheer. The Tulle may be formed of a 20 denier yarn that may be monofilament or multifilament but other denier yarns whether monofilament or multi-filament are contemplated. In one embodiment the front sheer may have an openness factor of about sixty-five percent (65%) or greater, and further may be a Steiger Leno and may have about 15-30 ypi in the cross (warp) and machine (weft) direction. The Tulle and Steiger Leno sheers with openness factors OF greater than sixty-five percent (65%) may be used with single layer non-cellular vanes configured in the privacy or shading orientation. In one embodiment, a covering having all non-cellular vanes, all multilayered cellular vanes, or a combination of non-cellular and cellular vanes may have a Tulle sheer having an openness factor of about eighty percent (80%) or greater for one of the front or rear vertical support members and a Leno fabric having an openness factor of about sixty-five percent (65%) or greater for the other of the front or rear vertical support members where at least the rear sheer may be a dark or black color.

Enhanced Vane Closure

It may be desirable in a covering that the vanes angularly orient and move uniformly and evenly along the entire length (height) of the sheets 118, 120, from top end 170 of panel 104 to bottom end 175 of panel 104, to minimize gaps between adjacent vanes 135. The relative length of the front and rear sheets, particularly between adjacent connection locations of the vanes to the front support member as compared to the rear or back support member, is an important factor in achieving full closure at the bottom end of the panel. Depending on the specific configuration of the covering and the material of the fabrics, distance 158 between adjacent connection locations 148, 148', 148" where vanes 112 are coupled to front sheet 118 (shown in FIG. 5) may be the same as or different from distance 160 between adjacent connection locations 142, 142', 142" on rear sheet 120. In addition, the distance between the very top connection location 148 and the very bottom connection location 148" on front sheet 118 may also be the same as or different from the respective distance between the very top connection location 142 and the very bottom connection location 142" on rear sheet 120.

More specifically, to facilitate tighter and/or enhanced closure of the vanes and the vertical support members, it is preferable that the vertical support member that rolls to the inside of the roller is longer than the vertical support member that rolls to the outside of the roller. In other words, it is advantageous to have the vertical support member/sheet that pulls the vanes into a closed position bear the weight and tension of the panel when the vertical support members/sheets are laterally close together and the covering is in a fully extended, closed position, or is being retracted. By adjusting the relative distances 158, 160 between connection locations (e.g., glue lines) 148, 142 of adjacent vanes 112 so that the vertical support member/sheet that pulls the vane closed is under tension by being shorter than the other vertical support member/sheet, the sequence, timing, and amount of closure of the vanes and the panel can be controlled. In addition, the vertical support member/sheet that carries the weight and rolls to the outside of the roller generally is under more tension and stretches more over time than the inner vertical support member/sheet. Adjusting the length of the vertical support members/sheets and distance between adjacent vanes so that the vertical support member/sheet that rolls to the outer side of the roller remains under tension over time (accounting for stretching) by being shorter than the other vertical support member/sheet preferably is also considered when calculating and adjusting the distances between adjacent connection locations, 142, 142', and 148, 148' on the front and rear vertical support members/sheets.

With reference to FIG. 5, adjusting distance (height/length) 158 between adjacent connection locations (e.g., glue lines) 148, 148' on front sheet 118 as compared to distance (height/length) 160 between adjacent connection locations (e.g., glue lines) 142, 142' on back sheet 120 is referred to as ratioing. For example, as shown in FIG. 5, where the covering is configured for a shading orientation, the distance along front sheet 118 between top most connection location 148 and bottom connection location 148" may be shorter than the distance along rear sheet 120 between top connection location 142 and bottom connection location 142". More specifically, distance 158 along front sheet 118 for each adjacent vane 112 may be shorter than distance 160 along rear sheet 120 for each adjacent vane 112.

The ratioing of the vertical support members/sheets to facilitate tighter and/or enhanced closure of the covering to the bottom of the panel can be used on a shading or privacy oriented covering product, but may be more advantageous on a shading oriented covering. One detrimental effect of increasing the distance (height/length) 158, 160 between connection locations (e.g., glue lines) of the inner vertical support member/sheet is that the inner vertical support member/sheet that rolls to the inside of the roller has extra material which may create wrinkles in the inner vertical support member/sheet. However, if the inner vertical support member/sheet forms rear vertical support member/sheet 120 on the back or exterior side 101 of the covering, as in a shading oriented product, the wrinkles or worm tracks in rear vertical support member/sheet 120 resulting from the extra material, will now end up on the back or exterior side 101 of the product, where, particularly with a black rear sheer, such wrinkles will be difficult to detect by the product user.

To provide closure or to assist and to facilitate closure of the covering to bottom end 175 of the panel/covering, the length from the very top connection location to the very bottom connection location for the vertical support member/sheet that rolls to the inside of the roller is generally as low as about 0.2% and as high as about 2% (and may vary therebetween in increments of about 0.1%) longer, preferably as low as about 0.25% and as high as about 1% longer, than the respective length between the very top connection location to the very bottom connection location of the other vertical support member/sheet that rolls to the outside of the roller. For example, in FIG. 5, distance 158 between adjacent connection location 148, 148', 148" preferably is shorter on front vertical support member/sheet 118 than distance 160 between adjacent connection location 142, 142', 142" on rear vertical support member/sheet 120, if front vertical support member/sheet 118 rolls to the inside of the roller with the panel in a shading orientation. Non-limiting examples for the percentage of the extra length of one of the front and rear vertical support member/sheet as compared to the other of the front and rear vertical support member/sheet include about as low as 0.25% to as high as about 2% longer in increments of 0.25% and include about 0.5%, about 0.75%, about 1%, about 1.25% and about 1.5% although other increments and ranges are contemplated, and will depend upon the width and desired characteristics of the multi-layered vanes. The relative length of the front and rear vertical support members/sheets and the distance between connection locations along the front and rear vertical support members/sheets can be adjusted so that all the cells and/or vanes will close at the same time.

Ratioing of fabric can be achieved with accurate metering of front and rear vertical support members/sheets 118, 120, preferably with an instantaneous and permanent bond of the generally horizontal vane elements to the generally vertical support members/sheets. Metering the vertical support members/sheets involves accurately controlling the feed of the vertical support member/sheet materials before the next vane is coupled to the vertical support members/sheets to achieve proper and controlled connection location differentials. Preferably the vanes are coupled to the vertical support members/sheets with an instantaneous and permanent bond preferably creating a single point/line of coupling or attachment. Because the vanes are instantaneously and permanently bonded and set at their respective permanent locations on the sheets, there is no need to flatten the material to make a permanent bond later.

Bottom Rail Configuration

The covering may include a bottom end rail 110 having a length that extends in the same direction as (e.g., along) the length of the vanes (and the width of the vertical support members and panel), and a width orthogonal to its length. The bottom rail generally, but not necessarily, has a length that is substantially the same as the length of vanes 112, which is generally the same as the width of the covering or panel. As illustrated in FIG. 14, in one embodiment bottom rail 180 preferably is coupled to rear vertical support member/sheet 120 where the bottom-most vane 112 connects to rear vertical support member/sheet 120, and preferably has a width "W" that is less than the width of the vanes. An insert 185 may be coupled to rear vertical support member/sheet 120 and insert 185 is inserted into a cavity in bottom rail 180. The front vertical support member/sheet may terminate at connection location 148 or, as shown in FIG. 14, may continue and be associated with or coupled to one or more of bottom rail 180, vane 112, or rear vertical support member/sheet 120 adjacent or within bottom rail 180. Bottom rail 180 preferably connects to the front vertical support member/sheet, and/or the vane, and/or the rear vertical support member/sheet at a single location or region that extends along the length of the bottom rail. In one embodiment, the bottom rail couples to the lowermost region where the vane is connected to the vertical support member/sheet. Bottom rail 180 may be coupled to at least rear vertical support member/sheet 120 which rolls up to the inside of the roller in a shading orientation.

An alternative embodiment of bottom rail 180' is shown in FIG. 15. Bottom rail 180' has a cavity 187 in communication with a channel 186. Rear vertical support member/sheet 120 may be adhesively bonded or glued to an insert 185', and may be bonded on the reverse side of insert 185' as shown in FIG. 15. Insert 185' may be laterally moved or slid into cavity 187 while rear vertical support member/sheet 120 extends through channel 186. Channel 186 preferably extends the length of bottom rail 185' and vertical support member extends out the channel 186 along its length. Insert 185' with one or more vertical support members may be positioned within channel 186' by other methods as well. Insert 185' is constrained from rotating in cavity 187. Front vertical support member/sheet 118 may terminate at connection location 148 (not shown) of the vane, or the front vertical support member/sheet may continue along the underside of the last vane and may terminate at apex 144 of the multi-layered vane, or the front vertical support member/sheet may continue past apex 144 of the last multilayered vane and be coupled to insert 185'. If the front vertical support member/sheet is coupled to insert 185', front vertical support member/sheet 118 will also extend into channel 186 and cavity 187. The bottom rail preferably couples to the panel at or along a single location or small region, and preferably applies its weight to a one and only one of the front and/or rear vertical support members, and preferably, for a covering in the shading configuration, to the rear vertical support member. Other constructions for bottom rail 180 and optional insert 185 are contemplated and would preferably couple or attach to the panel along a single location or small region along the lowermost region where the vane connects to the vertical support member, and would be apparent to a person of ordinary skill in the art.

Rear sheet 120 in covering 100 in FIGS. 14 and 15 is configured to be the vertical support member that rolls up around the roller (not shown) to the inside of front vertical support member 118. There are several benefits of using a bottom rail 180 coupled to inner vertical (support) sheet 120. By putting weight on sheet 120 that will roll to the inside of the roller tube, sheet 120 may be stretched and may assist all the vanes to completely and evenly close (e.g., fully angularly rotate) all the way from top end 170 to bottom end 175 of panel 104 by pulling the lower-most portion of vane 112 downward. Meanwhile, no weight is placed on outside sheet 118, and the two sheets 118, 120 are not pushed apart by the width of the bottom rail as may happen with a bottom rail that spans across and is coupled to the two sheets at two separate and different locations, or both sides of the vane at two separate and different locations along the bottom rail. Bottom end rail 180 coupled at or along a single location to only the inner vertical support member/sheet also may be more aesthetically pleasing, especially on a product when deployed in a shading orientation. A traditional curved bottom rail, coupled to both sheets at two different and separate locations as shown in FIG. 3A, will be in direct view as the covering in a shading orientation rolls up, and may be hard to hide from view behind a valance or head rail once rolled up. Preferably a low profile or minimalistic bottom rail, such as illustrated in the embodiments of FIGS. 14 and 15 is used, although it will be appreciated that other configurations for the bottom rail such as illustrated in FIG. 1A may be used.

Method of Manufacturing a Flexible Panel

A method of forming a flexible panel for use as an architectural covering may include:
(a) providing a plurality of multi-layered vanes having a top layer and bottom layer, the bottom layer preferably being wider than the top layer; and
(c) coupling the multi-layered vane to a front support member, e.g., sheer, and a rear support member, e.g., sheer, to form the panel.

In one embodiment, providing a multi-layered vane may include providing a separate top strip and a separate bottom strip and overlaying the strips so the respective two side edges are aligned (or nearly aligned) and coupling the strips along their side edges in coupled regions, and in some embodiments only along their side edges, and preferably continuously along their side edges. The coupled regions may form apexes or hinge regions of the multi-layered vane. The width of the coupled region orthogonal to the side edges of the respective strips may be small and generally are less than 2 mm, preferably less than the average thickness of the materials, and generally between about 1.0 mm and about 0.125 mm. The coupled region preferably facilitates the formation of a flex point, hinge, or semi-hinge 133, which facilitates opening of the cell or cavity of the multi-layered vane to create an aesthetically shaped, preferably double "S" shaped, cellular vane. In one embodiment, one or both side edges are welded, e.g., ultrasonic cut-seal or hot-knife cut-seal, to form the coupled region between the top and bottom strips.

Alternatively, in another embodiment, a fold line may be created to form one of the apexes or hinge regions of the multi-layered vane. For example, in an alternate embodiment, the top and bottom layers are formed of the same piece of material that may be folded, and optionally creased, perforated, and/or heat-set so that the side edges are co-linear and a fold line (e.g., a preferential fold line) is formed in the material, and the remaining free side edges are coupled together along a coupled region. In this manner, the crease or fold line may form one apex and hinge, and the coupled side edges form the other apex (and/or coupled region) and hinge.

In yet a further embodiment, the multi-layered vane may be provided by providing a separate top strip and a separate bottom strip and overlaying the strips so the respective side edges are aligned or nearly aligned and coupling the side edges to form coupled regions where at least one coupled region is created using an adhesive process and the other coupled region is created using a fusing process, and may be formed using an ultrasonic cut-seal or hot-knife cut-seal welding process.

Localized regions adjacent to the ultrasonic weld (the coupled region) may be formed which are thinned out and further add to the flexibility of the vanes at the coupled region and which provide an even more flexible hinge or flex point 133 at or adjacent to the coupled regions at the edges of the vanes. As an alternative, a hot-knife cut seal could produce the weld and should result in thin attachment area widths comparable to ultrasonic cut-seal. Glue or adhesive bonding may be utilized and may achieve a bonding area width of about 1.5 mm or more. The glue bonding may create a stiffer, thicker region for the coupled region and the coupled region may extend a distance away from apexes 144, 146, and so the effective distance where the two fabrics are held parallel to each other at the apexes of the vanes could be as much as 3 mm.

The multi-layered vanes may be coupled to the sheets with adhesive. For example, hot melt and UV cure adhesives and processes can be used for coupling the vanes to the sheers. A polymer-containing adhesive may be used and preferably should not alter the properties of the fabric or the sheets. An alternative way of coupling the vanes to the sheets is sewing which is much more cumbersome and labor intensive. While the covering 100 may be formed by independently forming the cellular vanes and then coupling the cellular vanes together, it should be appreciated that other methods of constructing the covering are feasible.

While adhesive can be placed on either the vanes or the vertical support members/sheets, it is advantageous to apply adhesive to the vanes, then assemble the vanes to the vertical support members/sheets for more accurate positioning of the vanes. Adhesive can be placed in a continuous line a distance away from the coupled regions/apexes where the multi-layered strips of the vanes are coupled together, and/or the fold line is located, preferably about 2 mm to about 8 mm, or one of the glue lines instead may overlap with one of the coupled regions and/or the fold line depending on the desired ornamental design and the shape of the cellular vanes and panel.

The present disclosure features a covering for architectural features having a panel formed of generally horizontal vane elements coupled to generally vertical support members with unique dimensionality, richness, and versatility. The covering or panel may be light-controlling and is aesthetically appealing as well as practical. The panel has a height and a width and generally includes a generally vertical front support element or member having a height and width, and a generally vertical rear support element or member having a height and a width, where the generally vertical rear support member is operably coupled to, and preferably laterally moveable relative to, the front support member. While panels and coverings with a front and rear generally vertical support member have been disclosed, it is contemplated and should be appreciated that additional generally vertical support members may be included in embodiments of the panel and/or covering, with generally horizontal vane elements, including non-cellular and/or multi-layered cellular vanes, extending between the plurality of generally vertical support members. In one embodiment, the front and/or rear vertical support member may be substantially planar and flat, preferably with no folds or creases formed therein, and the rear vertical support member may be substantially parallel to the front vertical support member and operably and preferably laterally moveable relatively coupled, directly or indirectly, to the front vertical support member. The panel may further include a plurality of generally horizontal vane elements extending between, and which may be coupled directly or indirectly, to the front and rear vertical support members, and both the front and rear vertical support members may control the movement and angular orientation of the vane elements, and may be laterally moveable with respect to each other. The plurality of moveable, generally horizontally extending vane elements may be manipulated and controlled by the vertical support members to control the amount of light inhibited, blocked or transmitted by or through the panel.

In one embodiment, the height and width of at least one, and preferably both, of the front and rear vertical support members is substantially the same as the height and width of the panel. In one embodiment, the length (e.g., height) of one or both of the vertical support members is shorter than the panel, and in one embodiment, the length (e.g., height) of one of the vertical support member is shorter than the other support member. Alternatively, or additionally, the plurality of horizontally extending vane elements have a length extending in the same direction as the width of the front and rear vertical support members, and the length of at least one, and preferably all, of the vane elements is substantially the same as the width of at least one, preferably all, of the vertical support members. In one embodiment, the width of the front and/or rear support member is less than the length of the vane elements. The vane elements may be formed of any type of material, including in preferred embodiments at least one of the group of materials consisting of translucent, semi-opaque, and opaque materials, and combinations thereof. The plurality of generally horizontally extending vane elements, and the front and rear vertical support members may be made from flexible materials to form a flexible panel, and in one embodiment the vane elements and support members may be formed of, for example, fabrics or films, including woven, non-woven, or knits, including polyester materials. One or more, and in some embodiments all, of the vane elements are non-cellular vanes. Alternatively, or additionally, one or more, and in some embodiments all, of the vane elements may be multi-layered cellular vanes that may form a cavity, preferably a tube with a horizontally extending cavity, in response to the front and rear support members being laterally separable.

The vertical support elements are preferably formed of materials that have openings that permit visibility through and light to pass there through. In one embodiment, at least one of the front and rear vertical support members has an openness factor of about sixty-five (65%) or greater. In one embodiment, in a flexible panel for an architectural opening, the front vertical support member may be a sheer and the rear vertical support member also may be a sheer. In one embodiment, the front and rear vertical support members may be two different sheer materials. In one embodiment, at least one of the front and rear support sheers may be selected from the group consisting of an open diamond shape and an open orthogonal grid shape, and preferably at least the other of the front and rear support sheers may be selected from the group consisting of an open diamond shape and an open orthogonal grid shape, although other shapes and sizes of the openings in the material are contemplated. In yet another embodiment, the rear support sheer has an openness factor greater than the openness factor of the front vertical support sheer, or vice versa. In a further embodiment, one or more of the support members or sheers may have an openness factor as low as 60%, and as high as 90%, (and may vary therebetween in increments of about 2%), more preferably an openness factor of about 65%, or greater, more preferably one or more support members or sheers may have an openness factor greater than 70%, of about 75% or greater, and more preferably about 80%, and greater, and may have an openness factor between about 80% to about 90%.

In some embodiments, one or more (at least one) of the vertical support members may be a dark color, for example, black, gray, or brown. In an embodiment, the rear vertical support member or sheer may be a darker color than the front support member, including the front sheer, or vice versa. For example, the dark vertical support members may be solution dyed, dispersion dyed, or both solution and dispersion dyed with carbon black. In one aspect, one or more support members may be dark and made from carbon black pigment colored material, preferably polyester. In one embodiment, the front vertical support member may be white, off-white, and clear and/or colored with titanium pigment, or vice versa. Having vertical support members with high openness factors and dark colors may increase view-through, and enhanced visibility of the vane elements may be achieved in certain embodiments.

At least one of the front and rear vertical support members may be selected from the group consisting of a knit Tulle sheer fabric and a woven Leno sheer fabric, and in a still further embodiment at least the other of the front and rear vertical support members may be selected from the group consisting of a knit Tulle sheer fabric and a woven Leno sheer fabric. At least one of the front and rear vertical support members may be a dark color, and in a selected embodiment, the rear vertical support member may be a black Tulle sheer fabric, preferably polyester and the front vertical support member may be a Leno sheer fabric, preferably polyester, or vice versa. In one embodiment, the rear vertical support member is a dark Tulle sheer fabric having an openness factor of about 80% or greater, and alternatively or additionally, the front vertical support member is a Leno sheer fabric having an openness factor of greater than 65%, or vice versa. In one embodiment, the Tulle fabric may be made from a 20 denier monofilament yarn dyed a dark color. In one embodiment, the front sheer may be a Leno weave fabric with approximately 20-25 ypi in both the warp and weft directions with openings of about 7.3 mm between the paired warp yarns and about 4.2 mm between the weft yarns, and in a still further embodiment the rear sheer is a Tulle fabric with openings of about 10.7 mm in width and about 14.1 mm in length preferably prepared on a 28-gauge knitter and stretched to an about 20-gauge fabric One or both of the front and rear sheers may be black or a dark color, one of the front or rear shears may be a light color, and the front fabric may be a Tulle sheer and the rear fabric may be a Leno sheer.

In an embodiment, the one or more vane elements may be a multi-layered structure having a top and bottom layer of material. The top and bottom layers may be formed of a single, integral, continuous sheet of material or multiple pieces of material. When extending between the front and rear generally vertical support members and operated as an architectural covering, the layers of the multi-layered vanes are moveable and may separate with respect to each other preferably to create cellular vanes that have walls that form generally horizontal expandable tubes that circumscribe a cavity or space with open ends, and which may be compressible to form a generally two-dimensional flat slat. A plurality of the collapsible and expandable tubes may be coupled to the vertical support members. Each collapsible and expandable tube may be coupled to the front vertical support member preferably along a single horizontally-extending connection location and coupled to the rear vertical support member preferably along a single horizontally-extending connection location. Each of the plurality of collapsed tubes may be coupled to the front vertical support member at different connection locations along the front vertical support member so that gaps may be formed between the multi-layered vanes when the tubes are expanded. Each of the plurality of collapsed tubes may be coupled to the rear vertical support member at different connection locations along the rear vertical support member so gaps may be formed between the multi-layered vanes when the tubes are expanded. The wall(s) created by the multi-layered vane in some embodiments may completely and continuously circumscribe the sides of the cavity, with the cavity being open at the ends of the multi-layered vanes. The layers of the multi-layered vane may form an elongated generally horizontal tube when the front and rear vertical support members are laterally spaced apart, and the volume of the cavity may increase as the front and rear vertical support members laterally separate further from each other and the volume of the cavity may decrease as the front and rear vertical support members move closer together.

In one embodiment, at least one of the top layer and the bottom layer of the multi-layered vane is made from non-woven materials, and in another embodiment both the top layer and the bottom layer are made from non-woven materials. The layers/strips of material forming the multi-layer cellular vanes may be formed of thinner non-wovens than single-layered vanes. The multi-layered vanes as a whole may be more stable than a single-layer vane and remain straight and clean, because the multi-layered vanes as an assembled combination may be thicker and may have better structural integrity and stability than a single-layered vane. In another aspect, the top layer may be darker in color than the bottom layer, and alternatively or additionally, the bottom layer may be made from one of the group consisting of translucent, semi-opaque, opaque, and room-darkening materials, and combinations thereof. In other aspects, at least one of the top layer and the bottom layer is printed on prior to forming the multi-layered laminate that forms the vane elements. One of the top layer and or the bottom layer may have a bottom surface printed in a duotone color and or a top surface printed in a monotone color. At least one of the top layer and the bottom layer may contain an antistatic material.

In one embodiment, the panel includes a plurality of multi-layered vanes, each multi-layered vane having a flexible top layer and a flexible bottom layer, each layer having a first side edge and a second side edge defining a width and two ends defining a length, and at least the first side edge of at least one top layer is coupled to at least the first side edge of its respective bottom layer at a first copied region, and in embodiments, the second side edge of the top layer is coupled to the second side edge of its respective bottom layer at a second coupled region. In one embodiment, the first and/or second coupled regions may form a first and/or second respective apex, and/or a first and/or second flexible hinge. The bottom layer may be coupled to one of the front and back support members (or sheers) at a first connection location and the top layer may be coupled to the other of the front and back support members at a second connection location, at least one of the first and second connection locations is spaced from its respective, proximate coupled region. In one embodiment, the top layer is separated from the bottom layer in response to the front support member being laterally spaced from the rear vertical support member. The flexible hinge may permit the layers of the multi-layered vane to easily separate at or immediately proximate to the coupled region, and preferably the layers easily and immediately separate at or immediately proximate to the coupled region. In one embodiment, the top and bottom layers may be formed from a separate top strip of material and a separate bottom strip of material. In one embodiment the top and bottom layers or strips of material forming the multi-layered vane may be coupled, preferably continuously along the entire length of their edges, in regions that are preferably thin, of narrow width, and flexible. The coupled regions may serve as a flex point or hinge so that the middle section of the top and bottom strips may easily separate from each other to form a longitudinal cavity and three-dimensional cellular vane.

In embodiments, each multi-layered vane has each first side edge of each top layer coupled to at least each first side edge of each respective bottom layer preferably to form first coupled regions, which preferably included first apexes, and/or first flexible hinges. The first side edge of the top layer may be coupled to the first side edge of the bottom layer along the entire length of the respective top and bottom layers to form the first coupled region along the entire length of the multi-layered vane. In one embodiment, the first coupled region is of narrow width and may have a width that is about the thickness of the layers or less, and preferably has a width as low as about 1.0 mm or less, more preferably between about 0.5 mm to about 0.1 mm (and may vary therebetween in increments of about 0.1 mm), depending upon the thickness of the vane layers. In one embodiment, the material of the top and bottom layers are fused in the first coupled region, and the first coupled region may be formed by welding, including, for example, ultrasonic welding or hot-knife welding. Each of the top and the bottom layers of the vane may be thinner in an area immediately adjacent to the first coupled region than in other areas spaced farther from the first coupled region.

Alternatively, or additionally, the second side edge of at least the first top layer is coupled to the second side edge of its respective bottom layer to form a second coupled region and preferably includes a second apex and/or a second flexible hinge. The second coupled region may be formed along the entire length of the second edges of the multi-layer vanes. The second coupled region may be formed by one of the group consisting of fusing the top and bottom layers together, adhesively bonding the top and bottom layers together, sewing the top and bottom layers together, and combinations of fusing, adhesively bonding, and sewing the top and bottom layers together, or other means of coupling or attaching such as staples, pins and tacks. The second coupled region(s) may have a narrow width, and may have a width that is about the thickness of the layers, or less, and preferably has a width as small as about 1.0 mm or less, more preferably, for example, between about 0.5 mm to about 0.1 mm, (and may vary therebetween in increments of about 0.1 mm), depending upon the thickness of the vane layers. In one embodiment, the layers of material forming the multi-layered vane may be fused along both their side edges, preferably continuously along the entire longitudinal length of both of their side edges, and the materials of the layers may be fused by, for example, welding (e.g., ultrasonic welding or hot-knife cut-seal welding). Each of the top and bottom layers of the vane may be thinner in an area immediately adjacent to the second coupled region then in other areas spaced further from the second coupled region.

In one embodiment, one or more multi-layered vanes may be formed of a single piece of material that may be configured, manipulated, folded, perforated, creased, and/or heat-set one or more times. In one embodiment, the single sheet of material may be folded over to create a top and bottom layer. In this embodiment, at least a portion of the side edge of the top layer of the multi-layered vane may be integral and formed of the same continuous sheet of material as the side edge of its respective bottom layer, the side edges forming an apex and fold line by at least one of the group consisting of folding, perforating, creasing, compressing, and heat-setting, and combinations thereof. The free side edges of the folded piece of material forming the multi-layered vane may optionally be aligned and coupled by fusing (e.g. welding, for example, ultrasonic or hot-knife welding) the side edge of the top layer to the side edge of the bottom layer to form a coupled region and a hinge, while the fold line created by folding, perforating, creasing, compressing, and/or heat-setting creates the other coupled region, apex, and hinge.

In some embodiments, the vane elements may include a separate third layer, or more layers or strips, and in a further embodiment a third layer or strip may be a middle layer located between the top and bottom strip, and that middle strip or layer may be formed of a room-darkening material which blocks light transmission. An example of a room-darkening layer may include Mylar, metalized plastic film, or a dark opaque material. The third layer in one embodiment may be printed on before forming the multi-layered vane. The third layer may be fused along its side edges or coupled by other means, for example, adhesive bonding, sewing, staples, and may be separable from the top and bottom layers.

The multi-layered vanes extend between the front and rear generally vertical supporting members. One end of the vane may be coupled to the front vertical support member at a first connection location, and the other end of the vane may be coupled to the other of the front or rear vertical support member at a second connection location. In the case of a multi-layered vane, in one embodiment, the bottom layer may be coupled to at least one of the front and rear vertical support members at the first connection location and the top layer may be coupled to the other of the at least one front and rear vertical support members at the second connection location. In one embodiment, the vanes are bonded to the front and rear supporting members using adhesive. In one embodiment, the bottom layer/strip of the multi-layered vane is glued to one of the front or rear vertical support members at the first connection location and the top layer/strip of the multi-layered vane is glued to the other of the rear or front vertical support members at the second connection location. The multi-layered vanes may be coupled to the sheets by adhesive, and the adhesive may extend continuously substantially the entire length of the multi-layered vane. The adhesive in one embodiment may have a width as small as 1.0 mm, preferably about 2 mm, and as large as about 10 mm, or larger.

The adhesive may be applied to the multi-layered vanes after the top layer/strip and bottom layer/strip are coupled together, and, more particularly, adhesive may be applied to the exterior surfaces of the top and bottom layer/strips, and the vanes may thereafter be applied to the vertical support members. The multilayered vanes may be independently formed by coupling the respective side edges of the top and bottom layers to form first and second coupled regions, or folding the sheet of material to form a fold line (e.g., first coupled region) and coupling the free edges to form the second coupled region, and thereafter adhesively bonding the multi-layered vane to the front and rear vertical support members at the first and second connection locations. The adhesive may be hot-melt or UV cured adhesive.

In one embodiment, at least one of the first connection location and the second connection location is spaced from its respective, proximate first coupled region (apex) by a first offset distance, and the top layer of the multi-layered vane is separated from the bottom layer when the front vertical support member is laterally spaced from the rear vertical support member to form at least one wall that forms a horizontally extending tube that circumscribes a cavity having a volume. In embodiments, at least one of the first connection location and the second connection location may be spaced from its respective, proximate first coupled region (or apex) by a first offset distance, and the other of the first and second locations may be spaced from its respective, proximate second coupled region (or apex) by a second offset distance. The offset distance between the first connection location and its respective proximate apex (or coupled region) may be different or the same as the offset distance between the second connection location and its respective proximate apex (or coupled region). Adhesive may be applied to both the layers/strips at the respective desired offset distances from the edges (apexes) or coupled regions. In one arrangement, at least one or both of the first connection location and the second connection location may be spaced from the first proximate, respective coupled region (or apex) by an offset distance as small as about 5% to as large as about 10% of the width of the respective vane layers (which may vary in increments of about 0.5%). In a further aspect, at least one or both of the first connection location and the second connection locations may be spaced from its respective, proximate coupled region (or apex) by an offset distance as low as about 1.0 mm to as high as about 8.0 mm or larger (which may vary therebetween in increments of about 0.5 mm), depending upon the width of the vanes and the desired shape and characteristics of the vanes.

Alternatively, at least one of the first connection location and the second connection location is spaced from its respective, proximate first coupled region (apex) by an offset distance and the other of the first and second connection locations is spaced from the fold line by an offset distance. Adhesive may be applied to both the layers/strips at the respective desired offset distances from the edges (apexes), coupled regions, or fold lines. In one arrangement, at least one of the first connection location and the second connection location may be spaced from the proximate, respective fold line by an offset distance as small as about 5% to as large as about 10% of the width of the respective vane layers (which may vary therebetween in increments of about 0.5%). In a further aspect, at least one of the first connection location and the second connection locations may be spaced from its respective, proximate fold-line by an offset distance as low as about 1.0 mm to as high as about 8.0 mm or larger (which may vary therebetween in increments of about 0.5 mm) depending upon the width of the vanes and the desired shape and characteristics of the vanes.

In another aspect, at least one of the coupled regions may be adjacent to one of the front or rear vertical support members, preferably the front vertical support member, and preferably substantially coincidently and/or overlap with at least one of the first and second connection locations. In one embodiment, the at least one coupled region is on the bottom layer and it may be substantially coincident with or at least overlap with one of the first and second connection locations on the front vertical support member. In another embodiment, the fold line forming the side edge of the top layer and the side edge of the bottom layer may be substantially coincident with at least one of the first and second connection locations on one of the front or rear vertical support members, preferably the front vertical support member. In one embodiment, the adhesive may be applied to one of the layers/strips at an offset distance from the first apex or first coupled region and applied to the other layer/strip so that it is substantially coincident with or at least overlaps with the second coupled region (and/or apex), or fold line.

In another aspect, at least one of the top and bottom layers may be substantially parallel to at least one of the front and rear vertical support members at the first connection location, and alternatively or additionally, the other of the top and bottom layer may be substantially parallel to the other of the at least one of the front and rear vertical support members at the second connection location. The top layer in embodiments may be substantially parallel to the rear vertical support member at the first connection location, and additionally or alternatively, the bottom layer may be substantially parallel to the front support member at the second connection location, or vice versa. In yet another aspect, the first coupled region forms a first apex, and at least one of the top layer and bottom layer between the first apex and the first connection location is substantially parallel to at least one of the front and rear vertical support member. In a further aspect, the second side edge of the top and bottom layer opposite the first coupled region forms a second apex, and at least one of the top and bottom layer between the second apex and the second connection location is substantially parallel to the other of the front and rear vertical support member. The second apex may be formed by one of the group consisting of adhesively bonding, welding, sewing, folding, creasing, perforating, and heat-setting the top and bottom layers, while the first apex may be formed by fusing, for example, by ultrasonic or hot-knife welding.

In yet another embodiment, the top layer of the multi-layered vane embodiment may have a different width than the bottom layer, and in one example, the bottom layer is larger than the top layer, or vice versa. For example, for a vane having a width of about 2.5 inches to about 4.5 inches, the bottom layer of a multi-layered vane may be wider than the top layer by as little as about 0.5 mm and by as much as about 4 mm, and may vary therebetween in increments of 0.1 mm. Other differences in width between the top layer and the bottom later are contemplated and will depend upon the width of the vanes, the material of the vanes, and the desired vane characteristics.

In another embodiment, by adjusting the relative length of the front and rear vertical support members, particularly the distance between the connection locations of the vanes to the front and rear vertical support members, vane closure for the covering and/or panel may be tightened and/or enhanced, particularly in a shading orientation, and the sequence of vane closure may be controlled. In any of the embodiments described herein, the two respective first connection locations at very top and bottom ends of the front vertical support member define a first distance and the two respective second connection locations at very top and bottom ends of the rear vertical support member define a second distance, the first distance may be different from the second distance, and the different distances between connection locations may facilitate closure of the vanes to the bottom of the panel. The above embodiments may further include two respective first connection locations of adjacent multi-layered vanes defining a first distance and two respective second locations of the respective adjacent multilayered vanes defining a second connection distance, the first distance being different from the second distance, and the different distances between connection locations may facilitate closure of the vanes to the bottom of the panel. In one embodiment, the first connection locations may be spaced along the front vertical support member and the first distance may be less than the second distance.

In still a further embodiment, a flexible panel for an architectural opening is disclosed that includes front and rear vertical support members, and a plurality of generally horizontally vanes having two side edges defining its width, wherein the vane is coupled to at least one of the front and rear vertical support members at a first connection location and the vane is coupled to the other of the at least one front and rear vertical support members at a second connection location, and wherein the distance between respective first connection locations on one of the front and rear vertical support members between adjacent vanes is different than the distance between respective second connection locations on the other of the front and back vertical support members between the same adjacent vanes to facilitate closure of the vanes in response to the panel being in the collapsed position, and the front vertical support member is adjacent to the rear vertical support member. In another embodiment, the first connection location is on the front vertical support member and the distance between respective first connection locations on the front vertical support member between adjacent vanes is greater than the distance between respective second connection locations on the rear vertical support member between the same adjacent vanes. Alternatively, the distance between respective first connection locations on the front vertical support member between adjacent vanes may be less than the distance between respective second connection locations on the back vertical support member between the same adjacent vanes.

The above embodiments may further include bottom rails, rollers, head rails, and control mechanisms to form a covering for an architectural opening. The covering may further include a bottom rail operatively associated with the bottom end of the panel, a movement mechanism to operate the roller, and/or a head rail to mount the roller. The covering in one embodiment may include a roller, and the top end of the panel may be operatively associated with the roller. In yet another embodiment, a bottom rail may be coupled to at least one of the rear vertical support member, the bottom most vane, and/or the front vertical support member preferably along a single region or line of the bottom rail which may assist with vane closure and also adds a desirable appearance to the panel. In one embodiment, the bottom rail has a length that extends in the same direction as the length of the vane, and a width orthogonal to its length that may be less than the width of the vanes, and the bottom rail may be coupled along only a single location along the panel (and/or vertical support member(s)), and may be coupled to only the rear vertical support member.

Also disclosed is a method of forming a flexible panel, comprising (a) providing a top layer of material having a first and second side edge and a bottom layer of material having a first and second side edge; (b) coupling a respective top layer and a respective bottom layer along respective first side edges to form a vane having a first coupled region, wherein the first coupled region along the side edges has a width of about 1.0 mm or less; (c) providing a front sheer and a rear sheer; and (d) coupling the vane to the front sheer and the rear sheer so that the vane extends between the front and rear sheer to form the panel. The method may further include applying an adhesive to the vane, followed by coupling the vane to the sheers. In addition, coupling the vane to the front and rear sheer may be performed using a hot melt or UV cured adhesive process. Coupling may include the process of one of the group consisting of ultrasonic welding and hot-knife welding and combinations thereof.

Those skilled in the art will recognize that the architectural covering has many applications, may be implemented in various manners and, as such is not to be limited by the foregoing embodiments and examples. Any number of the features of the different embodiments described herein may be combined into a single embodiment. The locations of particular elements, for example, the coupled regions (apexes) and glue line (coupling or attachment) locations may be altered. Alternate embodiments are possible that have features in addition to those described herein or may have less than all the features described. Functionality may also be, in whole or in part, distributed among multiple components, in manners now known or to become known.

It will be appreciated by those skilled in the art that changes could be made to the embodiments described above without departing from the broad inventive concept. It is understood, therefore, that this invention is not limited to the particular embodiments disclosed, but it is intended to cover modifications within the spirit and scope of the invention. While fundamental features of the invention have been shown and described in exemplary embodiments, it will be understood that omissions, substitutions, and changes in the form and details of the disclosed embodiments of the architectural covering may be made by those skilled in the art without departing from the spirit of the invention. Moreover, the scope of the invention covers conventionally known, and future-developed variations and modifications to the components described herein as would be understood by those skilled in the art.

In the claims, the term "comprises/comprising" does not exclude the presence of other elements, features, or steps. Furthermore, although individually listed, a plurality of means, elements, or method steps may be implemented by, e.g., a single unit, element, or piece. Additionally, although individual features may be included in different claims, these may advantageously be combined, and their inclusion individually in different claims does not imply that a combination of features is not feasible and/or advantageous. In addition, singular references do not exclude a plurality. The terms "a", "an", "first", "second", etc., do not preclude a plurality. Reference signs or characters in the disclosure and/or claims are provided merely as a clarifying example and shall not be construed as limiting the scope of the claims in any way.

The foregoing description has broad application. It should be appreciated that the concepts disclosed herein may apply to many types of covering panels or shades, in addition to those described and depicted herein. Similarly, it should be appreciated that the concepts disclosed herein may apply to many types of coverings, in addition to the coverings described and depicted herein. For example, the concepts may apply equally to a top rail or any other rail movable through a handle assembly. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A flexible, multi-layered panel for a window covering to adjust the amount of light that passes there through, the flexible, multilayered panel comprising:
   a front vertical support member having a height and width;
   a rear vertical support member having a height and a width, the rear vertical support member substantially parallel to the front vertical support member and operably coupled and laterally moveable relative to the front vertical support member; and a plurality of generally horizontal vanes extending between the front and rear vertical support members:

wherein both the front and rear vertical support members control the movement and angular orientation of the vanes;

a first of the front vertical support member or the rear vertical support member is a sheer fabric formed from polymer-based yarns, the sheer fabric containing openings that have a first shape and has an openness factor in the range of about seventy-five percent (75%) to about ninety percent (90%); and a second of the front vertical support member or rear vertical support member is a knit fabric formed from polymer-based yarns, the knit fabric containing openings that are a different shape than the first shape of the openings in the sheer fabric and has an openness factor in the range of about seventy-five percent (75%) to about ninety percent (90%).

2. The flexible panel of claim 1, wherein the rear vertical support member has an openness factor greater than the openness factor of the front vertical support member.

3. The flexible panel of claim 1, wherein the yarns of the sheer fabric of the first of the front and rear vertical support members have a denier of about 16 to about 24.

4. The flexible panel of claim 1, wherein the sheer fabric of the first of the front vertical support member or the rear vertical support member has fifteen (15) to thirty (30) yarns per inch (ypi) in the cross-direction and fifteen (15) to thirty (30) yarns per square inch (ypi) in the machine-direction forming rectangular-shaped openings, and wherein the sheer fabric is configured so that weight of the panel is aligned with and supported by either the cross-direction yarns or the machine-direction yarns.

5. The flexible panel of claim 1, wherein the plurality of vanes are coupled to respective vertical support members with adhesive, wherein the adhesive extends substantially the length of each vane and has a width of about 1 mm to about 10 mm.

6. The flexible panel of claim 1, wherein each vane is connected to the front vertical support member at a first connection location and is connected to the rear vertical support member at a second location, and two respective first connection locations at very top and bottom ends of the front vertical support member define a first distance and two respective second connection locations at very top and bottom ends of the vertical support member define a second distance, the first distance being different from the second distance.

7. The flexible panel of claim 1, wherein each vane is connected to the front vertical support member at a first connection location and is connected to the rear vertical support member at a second location, and the distance between respective first connection locations on the front vertical support member between adjacent vanes is less than the distance between respective second connection locations on the back vertical support member between the same adjacent vanes.

8. The flexible panel of claim 1, wherein the second of the front vertical support member or the rear vertical support member is a knit Tulle sheer fabric.

9. The flexible panel of claim 8, wherein the front fabric is a Leno fabric.

10. The flexible panel of claim 1, wherein at least one of the front or rear vertical support members is a dark color.

11. The flexible panel of claim 10, wherein the plurality of vanes have a length extending in the same direction as the width of the front and rear vertical support members, and the length of at least one vane is substantially the same as the width of at least one of the vertical support members.

12. The flexible panel of claim 10, wherein at least one of the dark colored vertical support members are formed of yarns that are selected from the group consisting of yarns that are solution dyed, dispersion dyed, and combinations thereof.

13. The flexible panel of claim 12, wherein the dark colored vertical support member is made from material that is dyed using carbon black pigment.

14. The flexible panel of claim 10, wherein the rear vertical support member is a dark color.

15. The flexible panel of claim 14, wherein the rear vertical support member is a black Tulle knit fabric.

16. The flexible panel of claim 1, wherein the rear vertical support member is a darker color than the front vertical support member.

17. The flexible panel of claim 16, wherein the front support member is a light colored material.

18. The flexible panel of claim 17, wherein the front support sheer is made from one of the group consisting of white, off-white, and clear material.

19. The flexible panel of claim 1, wherein the plurality of vanes include multi-layered cellular vanes having a flexible top layer and flexible bottom layer that separate to form a cavity in response to the front and rear support members being laterally separated.

20. The flexible panel of claim 19, wherein the multi-layered vane includes a third layer, wherein the third layer is positioned between the top and bottom layer and comprises a metalized film.

21. The flexible panel of claim 19, wherein the top layer has a different width than the bottom layer.

22. The flexible panel of claim 21, wherein the bottom layer is larger than the top layer by about 0.5 mm to about 4 mm.

23. The flexible panel of claim 19, wherein each top and bottom layer has two side edges defining a width and two ends defining a length, a first side edge of at least one top layer is coupled at a first coupled region along a first side edge of its respective bottom layer, and the bottom layer is coupled to the front vertical support member at a first connection location and the top layer is coupled to the rear vertical support member at a second connection location, at least one of the first connection location and the second connection location is spaced from its respective, proximate first coupled region, and the top layer is separated from the bottom layer in response to the front vertical support member being laterally spaced from the rear vertical support member to form a cavity.

24. The flexible panel of claim 23, wherein the first coupled region has a width in the width direction of the layers, the width of the first coupled region being about 1 mm or less.

25. The flexible panel of claim 24, wherein the first coupled region is formed by one of the group consisting of ultrasonic welding and hot-knife welding.

26. The flexible panel of claim 23, wherein the second side edge of said at least top layer of the multi-layered vane is coupled along the second side edge of its respective bottom layer to form a second coupled region.

27. The flexible panel of claim 26, wherein the second coupled region is formed by one of the group consisting of ultrasonic welding, hot-knife welding, adhesive bonding, and combinations thereof.

28. The flexible panel of claim 26, wherein the second coupled region has a width of about 1.0 mm or less.

29. The flexible panel of claim 26, wherein both of the first connection location and the second connection location are spaced from the respective, proximate first and second coupled regions of the respective layers, and wherein at least one of the first connection location and the second connection location is spaced from its respective, proximate first coupled region by a distance of about 1.0 mm to about 8.0 mm.

30. The flexible panel of claim 23, wherein the second side edge of the top layer of the multi-layered vane having the first coupled region is integral and formed of a same sheet of material as the second side edge of its respective bottom layer, the second side edges forming a fold line by at least one of the group consisting of folding, perforating, creasing, compressing, heat-setting, and combinations thereof.

31. The flexible panel of claim 30, wherein the fold line forming the second side edge of the top layer and the second side edge of the bottom layer is substantially coincident with the second connection location on the front vertical support member.

32. The flexible panel of claim 30, wherein at least one of the first connection location and the second connection location is spaced from its respective, proximate first coupled region and the other of the first and second connection locations is spaced from the fold line.

33. The flexible panel of claim 23, wherein the first coupled region is adjacent to the front vertical support member and overlaps with the first connection location on the bottom layer.

34. The flexible panel of claim 23, wherein the multilayered vanes are independently formed by coupling at least one of the respective side edges of the top and bottom layers to form the first coupled region, and adhesively bonding the multi-layered vane to the front and rear vertical support members at the first and second connection locations.

35. A flexible panel for a window covering having a height and a width, the flexible panel for adjusting the amount of light that passes there through and comprising:
 a front general vertical support sheer having a height and width, the height and width of the front support sheer being substantially the same as the height and width of the panel;
 a rear vertical support sheer having a height and a width, the height and width of the rear support sheer being substantially the same as the height and width of the panel, the rear vertical support sheer substantially parallel to the front vertical support sheer, and operably coupled and laterally moveable relative to the front vertical support sheer; and
 a plurality of generally horizontal vanes having a length and having a width, at least a portion of the width of the vanes extending between the front and rear vertical support sheers, the length of the vanes being substantially the same as the width of the front and rear vertical support sheers, the front and rear support sheers controlling the movement and angular orientation of the vanes;
wherein the front support sheer is formed of polymer-based threads and has an openness factor in the range of about seventy-five percent (75%) to about ninety percent (90%), and the rear support sheer is formed of polymer-based threads and has an openness factor greater than the openness factor of the front vertical support sheer, and the rear support sheer is a darker color than the front support sheer.

36. A covering for an architectural feature having a width and a height, the covering for adjusting the amount of light that may pass there through and comprising:
 a roller; and
 a flexible panel having a width, a top and a bottom end defining a height of the panel, the top end of the panel operatively associated with the roller, the panel comprising:
 a front general vertical support sheer having a height and width;
 a rear vertical support sheer having a height and a width, the rear vertical support sheer substantially parallel to the front vertical support sheer, and operably coupled and laterally moveable relative to the front vertical support sheer; and
 a plurality of generally horizontal vanes extending between the front and rear vertical support sheers, the front and rear support sheers controlling the movement and angular orientation of the vanes;
wherein the front and rear support sheers both are formed of polymer-based threads and both have an openness factor in the range of about seventy-five percent (75%) to about ninety percent (90%), and at least one of the front and rear support sheers is a dark color.

* * * * *